United States Patent [19]
Chambers et al.

[11] Patent Number: 5,993,074
[45] Date of Patent: Nov. 30, 1999

[54] HIGH SPEED ELECTRO-OPTICAL SIGNAL TRANSLATOR

[75] Inventors: Frank A. Chambers, Warrenville; R. Gilbert Kaufman, Chicago; Melvin C. Schmidt, Lisle; Michael G. Ressl, Western Springs; John G. Kwasegrock, Algonguin, all of Ill.

[73] Assignee: Molex Fiber Optics, Inc., Downers Grove, Ill.

[21] Appl. No.: 08/912,316

[22] Filed: Jun. 20, 1997

Related U.S. Application Data

[62] Division of application No. 08/149,060, Nov. 8, 1993, Pat. No. 5,644,668, which is a division of application No. 07/802,897, Dec. 6, 1991, Pat. No. 5,276,756, application No. 08/148,574, Nov. 8, 1993, abandoned, application No. 08/148,843, Nov. 8, 1993, Pat. No. 5,375,182, application No. 08/148,382, Nov. 8, 1993, Pat. No. 5,422,972, application No. 08/148,881, Nov. 8, 1993, abandoned, application No. 08/150,379, Nov. 8, 1993, abandoned, application No. 08/148,969, Nov. 8, 1993, abandoned, and application No. 08/149,067, Nov. 8, 1993, abandoned.

[51] Int. Cl.⁶ .............................. G02B 6/00; G02B 6/36
[52] U.S. Cl. .............................................. 385/90
[58] Field of Search .................... 385/90–93, 80, 385/81, 84, 88, 14, 49; 359/152, 153, 159, 173, 176; 357/19, 30

[56] References Cited

U.S. PATENT DOCUMENTS

| | | |
|---|---|---|
| 3,841,733 | 10/1974 | Ebersole . |
| 4,037,932 | 7/1977 | Hass et al. . |
| 4,060,309 | 11/1977 | Le Noane et al. . |
| 4,466,696 | 8/1984 | Carney . |
| 4,722,586 | 2/1988 | Dodson et al. . |
| 4,763,979 | 8/1988 | Heywang . |
| 4,774,626 | 9/1988 | Charboneau et al. . |
| 4,783,852 | 11/1988 | Auracher . |
| 4,786,918 | 11/1988 | Thorton et al. . |
| 4,787,696 | 11/1988 | Norris et al. . |
| 4,802,727 | 2/1989 | Stanley . |
| 4,813,771 | 3/1989 | Handschy et al. . |
| 4,927,228 | 5/1990 | Van De Pass . |
| 5,018,820 | 5/1991 | Boudreau et al. ..................... 385/90 |
| 5,020,873 | 6/1991 | Althaus et al. . |
| 5,073,003 | 12/1991 | Clark ..................................... 385/33 |
| 5,163,113 | 11/1992 | Melman . |
| 5,195,155 | 3/1993 | Shimaoka et al. . |
| 5,243,671 | 9/1993 | Koteles et al. . |
| 5,327,512 | 7/1994 | Penner et al. . |

Primary Examiner—Akm E. Ullah
Attorney, Agent, or Firm—Rogers & Killeen

[57] ABSTRACT

An electro-optical signal translator, signal translator design features, methods of fabrication, alignment techniques and alignment apparatus that utilize, with the exception of output optical fiber to transmitter module coupling, passive assembly techniques that are compatible with assembly line operations to produce high performance electro-optical signal translators.

20 Claims, 16 Drawing Sheets

HIGH SPEED ELECTRO-OPTICAL SIGNAL TRANSLATOR

This application is a division of application Ser. No. 08/149,060, filed Nov. 8, 1993 now U.S. Pat. No. 5,644,668 which is a division of application Ser. No. 07/802,897 filed Dec. 6, 1991 now U.S. Pat. No. 5,276,756. Application Ser. No. 08/148,574 filed Nov. 8, 1993 now abandoned; application Ser. No. 08/148,843 filed Nov. 8, 1993 now U.S. Pat. No. 5,375,182; application Ser. No. 08/148,382, filed Nov. 8, 1993 now U.S. Pat. No. 5,422,972; application Ser. No. 08/148,881 filed Nov. 8, 1993 now abandoned; application Ser. No. 08/150,379 filed Nov. 8, 1993 now abandoned; application Ser. No. 08/148,969 filed Nov. 8, 1993 now abandoned; and application Ser. No. 08/149,067 filed Nov. 8, 1993 now abandoned are divisions of application Ser. No. 07/802,897 filed on Dec. 6, 1991 now U.S. Pat. No. 5,276, 756.

BACKGROUND OF THE INVENTION

This invention relates to optoelectronic interface systems, and more particularly to methods and apparatus for conversion of information having high data rates between electrical and optical signals.

High speed data processing nodes require that information within the nodes, as well as between the nodes, be transmitted via data links that provide as great a data rate as possible. Limitations on the maximum permissible data rate of the data links include the limited information signal bandwidth and signal-to-noise ratio of the data link channel and the limited information signal bandwidth, signal-to-noise ratio and power dissipation of the data link translators.

According to the prior art, intra-mode data links and most inter-mode data links comprise translators that comprise transceivers or transmitters and receivers connected together via data link channels that comprise electrical signal transmission lines. Electrical translators generally have a trade-off between information signal bandwidth, signal-to-noise ratio and power dissipation. This is because the dimensions of the translators must be small to secure good information signal bandwidth, but the small size of translators with good information signal bandwidth limit their power handling or signal recovery ability, causing poor signal-to-noise ratio.

Electrical data link channels have a trade-off between information signal bandwidth and signal-to-noise ratio because much of the noise content of electrical data link is typically due to capacitive or inductive coupling of stray electrical signals or noise and the amplitude of such noise is generally proportional to frequency response of the data link channel. Although the data link channel may be made low impedance to reduce stray coupling, the higher signal current results in greater channel signal attenuation. This causes a loss in signal-to-noise ratio unless the data link translators can handle higher power levels, but this is usually not possible because the translators with good information signal bandwidth characteristics generally have limited power handling ability.

Optical signal data links can overcome many limitations of the electrical signal data link systems for both intra-mode and inter-mode data transmission. Optical data link channel noise is generally much lower than that of electrical data link channel noise due to insignificant optical stray signal coupling levels. The information signal bandwidth of optical data link channels is generally much better as well.

Although the performance of electro-optical signal translators can have advantages over electrical signal translators for data links both in terms of information signal bandwidth and signal-to-noise ratio, superior performance is hard to secure from such electro-optical signal translators because of the critical design parameters that are required for their fabrication. Amongst the problems that are encountered are efficient coupling of the electro-optical signal translators to the optical signal channels and alignment of the translator components to each other.

Each optical signal channel comprises a suitably terminated optical fiber. The electro-optical signal translators according to the prior art generally comprise a laser source element, a modulator element, a detector element, or a combination thereof, mounted on respective mounting substrates. For instance, an electro-optical translator that comprises a receiver module typically has a configuration that comprises a detector element mounted on a respective substrate.

Electro-optical translators that comprise transmitter modules generally have a configuration that comprises a laser source element mounted on a respective mounting substrate. The electrical power supplied to the power source input of the laser source element varies in intensity with the electrical input signal to directly modulate the laser source element. Although this configuration is simple, it generally suffers from poor output signal bandwidth and signal-to-noise ratio, since the input signal must be electrically amplified to a high level to modulate the laser source element and the laser source element has a limited signal frequency bandwidth.

All directly modulated lasers, except for those that employ distributed feedback, have serious color dispersion when coupled to a single mode fiber. This is because the wavelength of the laser hops around as its current is modulated. The different wavelengths that are generated as a result of mode hopping by the directly modulated laser are each propagated by a single mode optical fiber as a single mode. However, these different propagated wavelengths also have different velocities in the optical fiber, so that serious modulation noise and signal frequency bandwidth reduction result.

Although lasers that employ distributed feedback can be directly modulated without mode hopping, they are very expensive. Furthermore, all directly modulated lasers, even those that employ distributed feedback, suffer from relaxation oscillations, or ringing, when modulated at very high data rates. Ringing can cause serious modulation noise and signal bandwidth loss unless it is well above the highest modulation signal frequency of interest.

Another, less common, configuration for optical transmitter modules comprises a laser source element coupled to an electro-optical modulator element, with both the laser source element and the modulator element mounted on a common mounting substrate. This configuration can provide excellent output signal bandwidth and signal-to-noise ratio with a relatively small input signal. This is because the input signal and the modulator input are both low level, so that design parameters may be optimized for electro-optical signal conversion performance rather than power rating. However, this configuration requires accurate and efficient alignment between the laser source and modulator elements on their mounting substrates, as well as associated coupling and output optical fibers.

Still another transmitter module configuration that has been tried uses a laser source stage integrated with a modulator stage within a single element in an attempt to provide the performance of a transmitter module that has a separate modulator element but alignment that is simplified so that the alignment steps are limited to the same number as the configuration that uses only a laser source element. However, the attempts to manufacture such a transmitter module configuration to date have been unsuccessful.

The performance of the electro-optical signal translators depends as much upon the alignment of their component elements and the alignment of these elements with the corresponding optical channels as the performance of each individual element. Because of this, attempts to fabricate high performance electro-optical signal translators have been hampered by tedious and laborious "active" alignment techniques, wherein the electro-optical signal translator must be constantly tested in performance during assembly to achieve accurate alignment.

"Active" alignment techniques, that is, alignment techniques that require operational testing of the transmitter module during alignment, have been required for fabrication of transmitter modules having any of the configurations described above because of the difficulty in accurately manipulating, mounting, and bonding the associated transmitter elements and optical fibers. The active alignment of the transmitter module configuration that uses separate transmitter laser source and modulating elements to the optical coupling and output fibers on the mounting substrate is particularly costly and tedious, making the manufacture of such high performance transmitter modules very expensive.

SUMMARY OF THE INVENTION

The present invention comprises an electro-optical signal translator, electro-optical signal translator features, methods of fabrication, alignment techniques and alignment apparatus that utilize, with the exception of a critical output optical fiber to the transmitter module, passive assembly techniques that are compatible with assembly line operations to produce high performance electro-optical signal translators. Active alignment is thus limited to attachment of critical output optical fibers to the transmitter module. Receiver module assembly involves only passive alignment techniques.

The electro-optical signal translators comprise components and component mounting substrates that have alignment marks that are registered with their respective optical axes so that the substrates can be bonded to the components when the complementary alignment marks on the substrates and the components are registered with each other.

The components and substrates for each module have complementary bonding pads that are preferably laser bonded, such by soldering or welding, through regions of the substrate, or alternatively each component, that are relatively transparent to the laser bonding radiation. The mounting substrates have special grooves that are registered with the alignment marks to facilitate mounting of optical fibers to the mounting substrate and to insure efficient coupling to the components mounted on the substrate. A special mounting tool facilitates attachment of the optical fibers to the mounting substrates.

In the preferred embodiment, the invention comprises an electro-optical translator that serves as an interface between electrical and optical signals, comprising: a translator component mounting substrate having a defined optical axis; at least one translator component having a defined optical axis that is mounted on an upper surface of said substrate; an optical fiber mounted on said upper surface of said substrate; first means for aligning said optical fiber substantially parallel with said optical axis of said substrate; at least one second means for aligning said at least one component on said upper surface of said substrate that has a fixed relationship with respect to said defined optical axis of said substrate; and at least one third means for aligning said at least one component on a lower surface of said at least one component that has a fixed relationship with respect to said defined optical axis of said at least one component and a fixed relationship with respect to said second at least one means for aligning.

In the preferred embodiment, for an electro-optical translator that serves as an interface between electrical and optical signals, the invention comprises a method of assembling at least one translator component on a translator component mounting substrate, comprising the steps of: marking at least one substrate alignment mark on an upper surface of said substrate that has a fixed relationship with respect to a defined optical axis on said substrate for said at least one component to be mounted on said substrate; marking at least one component alignment mark on a lower surface of said at least one component that has a fixed relationship with respect to a defined optical axis on said at least one component; directing first radiation that has a spectrum that at least overlaps the transparent region of the absorption spectrum for the thickness of a selected one of a first group that comprises said substrate and said at least one component; monitoring said first radiation that is reflected off of at least a portion of said upper surface of said substrate and at least a portion of said adjacent lower surface of said at least one component; registering said at least one component alignment mark on said at least one component with said at least one substrate alignment mark on said substrate in a predetermined relationship to each other to align said at least one component with said substrate mark; directing second radiation through the thickness of a selected one of a second group that comprises said substrate and said at least one component that has a wavelength in the transparent region of the absorption spectrum for the thickness of said selected one of said second group to at least a portion of an upper surface of said substrate and at least a portion of an adjacent lower surface of said at least one component that absorbs a significant amount of said directed radiation; controlling the power of said directed second radiation to bond said at least a portion of an upper surface of said substrate to said at least a portion of an adjacent lower surface of said at least one component; attaching a planar surface of an optical fiber holder to a manipulator; attaching said optical fiber to a groove that runs substantially parallel to said planar surface along an elevated pedestal region of said optical fiber holder; placing said optical fiber in a groove that runs along said upper surface of said mounting substrate with said manipulator; and attaching said optical fiber and optical fiber holder to a groove along said upper surface of said substrate.

In the preferred embodiment, for an electro-optical translator that serves as an interface between electrical and optical signals, the invention also comprises a method of aligning at least one translator component on a translator component mounting substrate, comprising the steps of: marking at least one substrate alignment mark on an upper surface of said substrate that has a fixed relationship with respect to a defined optical axis on said substrate for said at least one component to be mounted on said substrate; marking at least one component alignment mark on a lower surface of said at least one component that has a fixed relationship with respect to a defined optical axis on said at least one component; and registering said at least one component alignment mark on said at least one component with said at least one substrate alignment mark on said substrate in a predetermined relationship to each other to align said at least one component with said substrate mark.

In the preferred embodiment, for an electro-optical signal translator that serves as an interface between electrical and optical signals, the invention additionally comprises a method of attaching at least one translator component on a translator component mounting substrate, comprising the steps of: positioning a lower surface of said at least one component on an upper surface of said substrate to mount said at least one component to said substrate; directing radiation through the thickness of a selected one of a group that comprises said substrate and said at least one component that has a spectrum in the transparent region of the absorption spectrum for the thickness of said selected one of said group to at least a portion of an upper surface of said substrate and at least a portion of an adjacent lower surface of said at least one component that absorbs a significant amount of said directed radiation; and controlling the power of said directed laser radiation to bond said at least portion of an upper surface of said substrate to said at least a portion of an adjacent lower surface of said at least one component.

In the preferred embodiment, for an electro-optical signal translator that serves as an interface between electrical and optical signals, the invention further comprises a method of illuminating mating inner surfaces of at least one translator component and a translator component mounting substrate, comprising the steps of: directing radiation that has a spectrum that at least overlaps the transparent region of the absorption spectrum for the thickness of a selected one of a group that comprises said substrate and said at least one component; and monitoring said radiation that is reflected off of at least a portion of said upper surface of said substrate and at least a portion of said adjacent lower surface of said at least one component.

In the preferred embodiment, for an electro-optical signal translator that serves as an interface between electrical and optical signals, the invention still further comprises a method of attaching an optic fiber to a translator component mounting substrate, comprising the steps of: attaching a planar surface of an optical fiber holder to a manipulator; attaching said optical fiber to a groove that runs substantially parallel to said planar surface along an elevated pedestal region of said optical fiber holder; placing said optical fiber in a groove that runs along an upper surface of said mounting substrate with said manipulator; and attaching said optical fiber and optical fiber holder to said groove along said mounting substrate surface.

In the preferred embodiment, for an electro-optical signal translator that serves as an interface between electrical and optical signals, the invention also comprises a method of attaching an optic fiber to a translator component mounting substrate, comprising the steps of: mounting a photodetector element with an input having an optical axis substantially parallel to an upper surface of said substrate a predetermined distance above said upper surface; attaching said optic fiber in a groove running substantially parallel to said optical axis of said photodetector axis along said upper surface of said substrate with a groove depth that maintains an optical axis of said fiber less than said predetermined distance of said optical axis of said photodetector element from said upper surface.

In the preferred embodiment, for an electro-optical signal translator that serves as an interface between electrical and optical signals, the invention additionally comprises an optical fiber holder for attaching an optic fiber to a translator component mounting substrate, comprising: a substantially planar upper surface; at least one substantially planar side surface that is substantially perpendicular to said upper surface; a pedestal region extending away from said upper surface that has a pedestal surface substantially parallel to said upper surface; and a fiber-holding groove that runs along said pedestal surface substantially parallel to said side surface.

DESCRIPTION OF THE INVENTION

Figure 1:
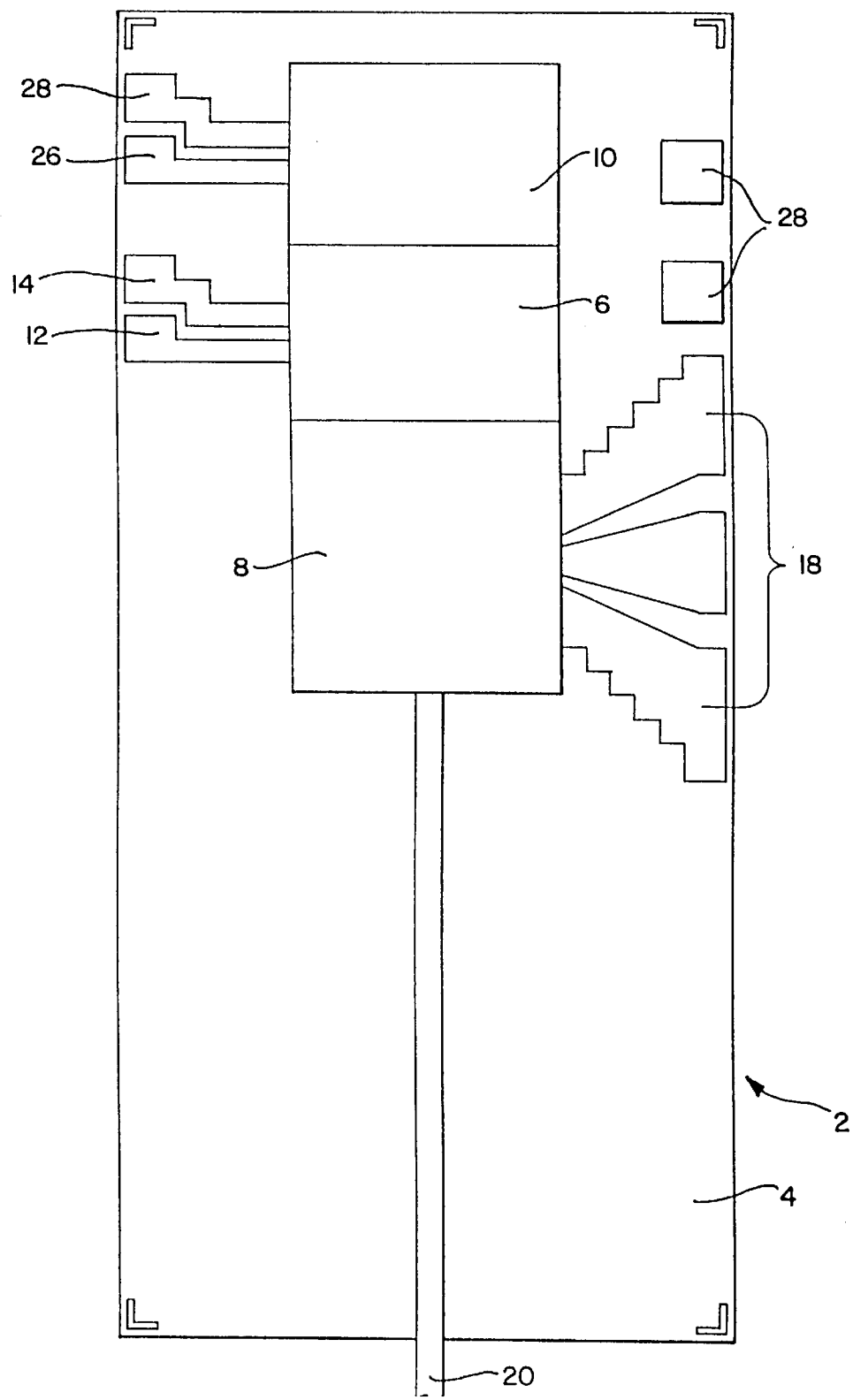
FIG. 1 is a top view of an optical transmitter module according to the invention.

Referring to the drawings, wherein reference characters designate like or corresponding parts throughout the views, FIG. 1 is a top view of an electro-optical signal translator that comprises an optical transmitter module 2 according to the invention. The transmitter module 2 comprises a transmitter module substrate 4 with at least a laser source element 6 and an electro-optical modulator element 8 mounted thereon. The substrate 4 comprises any electrically insulative material that is suitable as a substrate for semiconductor and thin-film fabrication techniques, such as silicon or gallium arsenside.

The laser element 6 comprises any suitable solid-state laser that can be packaged as a miniature submodule, such as a laser diode element or laser diode array. The electro-optical modulator element 8 comprises any suitable electro-optic modulator that varies light transmission in proportion to an electric input signal and can be packaged as a miniature submodule, such as an electro-absorption-type modulator.

The output level of the laser element 6 is conveniently monitored by a photodetector element 10 that is also mounted on the substrate 4. The photodetector element 10 comprises any suitable solid-state photoelectric element that can be packaged as a miniature submodule, such as a photoelectric detector fabricated from gallium arsenside.

Figure 2:
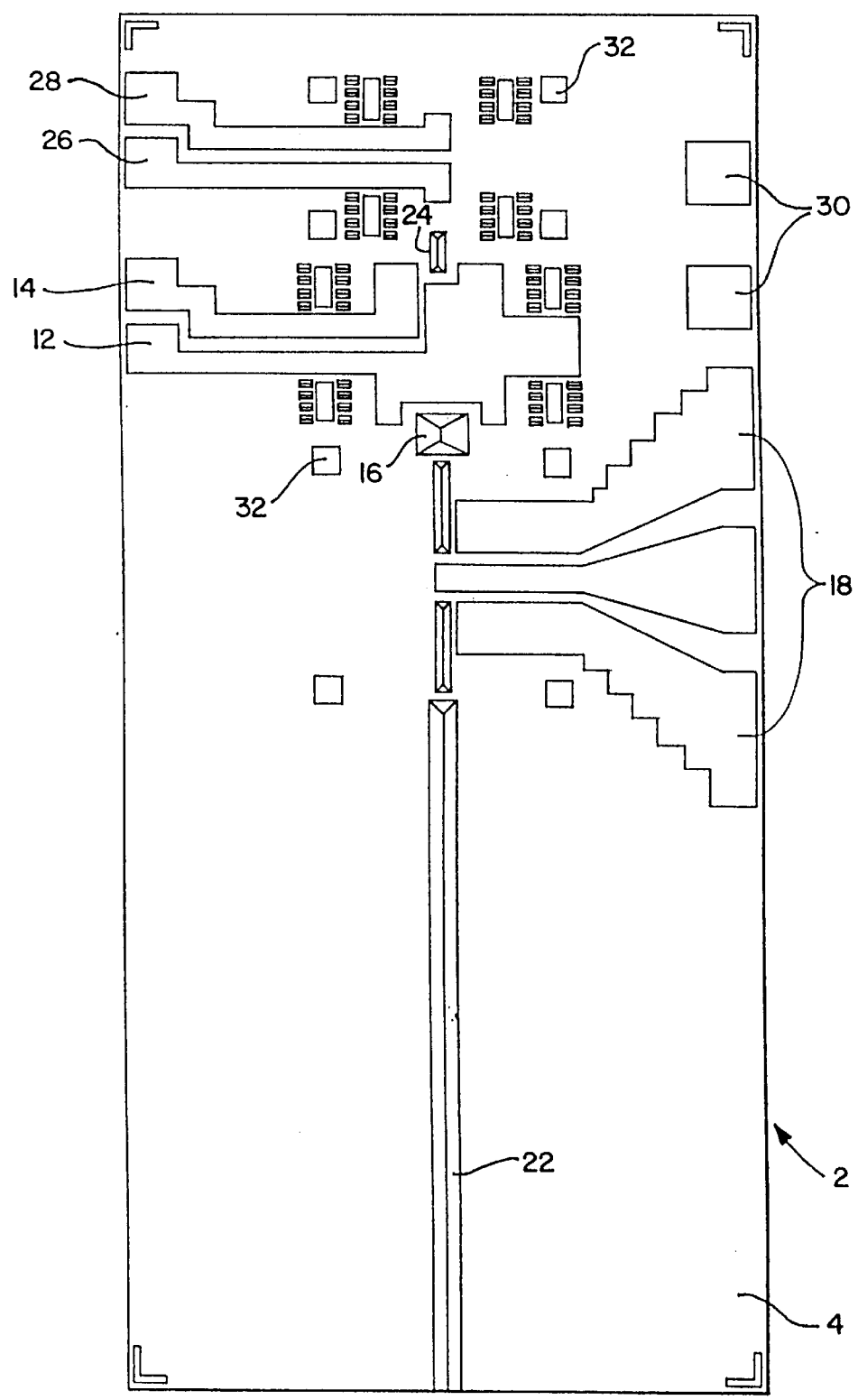
FIG. 2 is a top view of the substrate for the transmitter module shown in FIG. 1 that illustrates its interfacial features for the components that it mounts.

FIG. 2 is a top view of the substrate 4 that illustrates interfacial features for the components that it mounts. The laser element 6 is energized by application of electrical power supplied by a unipotential source (not shown) via a source power line 12. The power line 12 typically comprises an electrically conductive metallization path that is patterned on the upper surface of the substrate 4 with well-known techniques. The power line 12 is most clearly shown in FIG. 2, which shows a top view of the substrate 4.

A ground line 14 for the laser element 6 typically comprises an electrically conductive metallization path that is also patterned on the upper surface of the substrate 4. The ground line 14 serves as an electrical return for the power supplied to the laser element 6 on the power line 12.

The optical energy supplied by the output of the laser element 6 is direct-coupled to the input of the modulator 8, such as by butting a primary surface of the laser element 6 from which its light radiates to the surface of the modulator element 8 that collects the radiated light. A shallow wide channel 16 is etched on the upper surface of the substrate 4 below the coupling of the laser element 6 to the modulator element 8 to prevent coupling of the phase-mismatched light that is reflected off of the upper surface of the substrate 4. The channel 16 is preferably anisotropically etched into the upper surface of the substrate 4.

The modulator element 8 modulates the optical energy that it collects from the laser element 6 in proportion to an electrical modulation signal that is coupled to the electrical input of the modulator element 8 via a modulator line 16. The modulator line 18 typically comprises a waveguide-type electrical transmission line metallization pattern that is fabricated on the surface of the substrate 4.

The modulated optical energy transmitted to the output of the modulator element 8 is coupled to the input of an optical fiber 20 that transfers the modulated optical energy to a destination (not shown). The optical fiber 20 is mounted in a substrate channel 22, preferably of the V-groove type, that is anisotropically etched into the upper surface of the substrate 4.

A portion of the optical energy supplied by the laser element 6 is direct-coupled to the input of the photodetector element 10, preferably by butting a secondary surface of the laser element 6 from which its light radiates to the surface of the photodetector element 10 that collects the radiated light. A small channel 24 is etched on the upper surface of the substrate 4 below the coupling of the laser element 6 to the modulator element 8 to prevent coupling of the phase-mismatched light that is reflected off of the upper surface of the substrate 4. The channel 24 is preferably anisotropically etched into the upper surface of the substrate 4.

The electrical output of the photodetector element 10 is transferred via a detector output line 26 to a remote monitor system (not shown). The detector output line 26 typically comprises an electrically conductive metallization path that is patterned on the upper surface of the substrate 4 with well-known techniques.

A ground line 28 for the photodetector element 10 typically comprises an electrically conductive metallization path that is also patterned on the upper surface of the substrate 4. The ground line 28 serves as an electrical return for the signal supplied by the photodetector element 10 on the output line 26. Additional metallization patterns, such as contact patterns 30, may be patterned on the surface of the substrate 4 for auxiliary components, such as a temperature sensor element (not shown).

According to the invention, additional metallization patterns, such as bonding pads 32, are fabricated on the substrate 4 to facilitate attachment of any of the laser element 6, the modulator element 8 and the photodetector element 10 to the substrate 4. The upper surfaces of the bonding pads 32 are bonded, such as by soldering or welding, to the respective adjacent lower surface of any of the laser element 6, the modulator element 8 and the photodetector element 10.

The laser element 6, the modulator element 8 and the photodetector element 10 are each preferably attached to the substrate 4 by bonding, such as by soldering or welding, the bonding pads 32 or any other suitable metallization pattern to the adjacent lower surfaces of each of the laser element 6, the modulator element 8 and the photodetector element 10 after positioning them on the substrate 4. According to the invention, the substrate 4 is rendered relatively transparent through its thickness for radiation that penetrates its lower surface, so that the radiation that is directed through the substrate 4 may be used to solder the bonding pads 32 or other suitable metallization patterns on the upper surface of the substrate to the adjacent lower surfaces of each of the laser element 6, the modulator element 8 and the photodetector element 10 without overheating the substrate 4.

The spectrum of the radiation is selected to be in a transparent region of the absorption spectrum for the thickness of the substrate 4, but also of such a spectrum that the laser bonded regions, such as the bonding pads 32, absorb significant amounts of radiation. In this way, the laser element 6, the modulator element 8 and the photodetector element 10 are soldered to the substrate 4 without overheating them. Laser radiation is preferred for this application, although infrared radiation produced by a noncoherent source may be used instead.

Radiation that has a spectrum that at least overlaps the transparent region of the absorption spectrum for the thickness of the substrate 4, such as noncoherent infrared light, is useful to monitor the registration of the laser element 6, the modulator element 8 and the photodetector element 10 on the substrate 4, as explained in detail below. In this case, the infrared light passes through the thickness of the substrate 4 from its lower surface.

Since it is preferable for the laser radiation to penetrate through the thickness of the substrate 4 from its lower surface to solder the laser element 6, the modulator element 8 and the photodetector element 10 to the substrate 4, it is preferable to use radiation that penetrates through the thickness of the laser element 6, the modulator element 8 and the photodetector element 10 from their upper surfaces to monitor the registration of the laser element 6, the modulator element 8 and the photodetector element 10 on the substrate 4.

Figure 3:
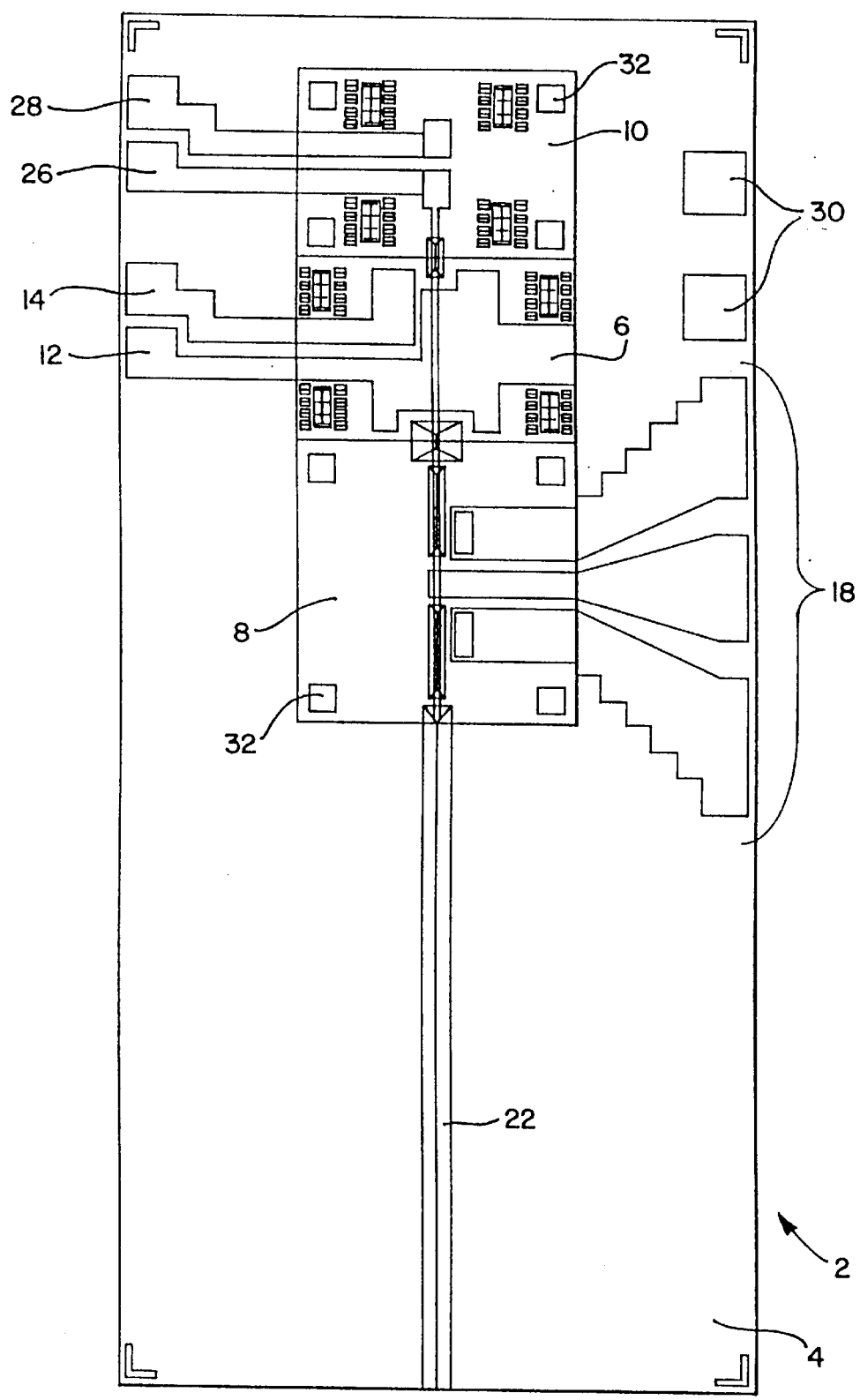
FIG. 3 is a top view of the transmitter module shown in FIG. 1 that renders the transmitter module components transparent to illustrate the registration of alignment features of the transmitter module components with the alignment features on the substrate.

In this case the radiation used for monitoring should have a spectrum that at least overlaps the transparent region of the absorption spectrum for the thickness of the laser element 6, the modulator element 8 and the photodetector element 10, such as noncoherent infrared light. FIG. 3 is a top view of the transmitter module 2 shown in FIG. 1 that renders the transmitter module components transparent to illustrate the registration of alignment features on the laser element 6, the modulator element 8 and the photodetector element 10 with the alignment features on the substrate 4.

When noncoherent light is used for illumination to implement alignment as described above, the infrared infrared light source is preferably low-pass filtered to remove wavelengths of light that are shorter than the longest wavelength bandgap of the transmitter components as defined by their composition and thickness. This prevents spurious radiation due to excitation of quantum well emitters in the transmitter components by the infrared illumination.

An infrared imaging system (not shown), such as an infrared sensitive charge-coupled device (CCD) camera, is used to view registration of the alignment features on the laser element 6, the modulator element 8 and the photodetector element 10 with the alignment features on the substrate 4. The light received by the imaging system may be filtered to pass only a limited bandwidth of the filtered infrared light to enhance imaging of the respective alignment features.

Alternatively, and also according to the invention, the laser element 6, the modulator element 8 and the photodetector element 10 may be rendered relatively transparent for laser radiation that penetrates through them from their upper surfaces. In this way, laser radiation that is directed through the upper surface of the laser element 6, the modulator element 8 and the photodetector element 10 may be used to solder the bonding pads 32 or other suitable metallization patterns on the upper surface of the substrate to the adjacent lower surfaces of each of the laser element 6, the modulator element 8 and the photodetector element 10 without overheating the laser element 6, the modulator element 8 and the photodetector element 10.

The wavelength of the laser radiation is selected to be in a transparent region of the absorption spectrum for the thickness of each of the laser element 6, the modulator element 8 and the photodetector element 10, but also of such wavelength that the laser bonded regions, such as the bonding pads 32, absorb significant amounts of radiation. In this way, the laser element 6, the modulator element 8 and the photodetector element 10 are soldered to the substrate 4 without overheating them.

As described above, the penetration of laser radiation may be used to solder metallization patterns other than the bonding pads 32 to securely attach any of the laser element 6, the modulator element 8 and the photodetector element 10. For instance, as shown in FIG. 3, the portions of the power line 12 and the ground line 14 underneath the laser element 6 may be soldered to the adjacent lower surface of the laser element 6. Likewise, the contact pads 30 may be soldered to the adjacent underside of an auxiliary component (not shown).

Also according to the invention, low resistance connections are secured by soldering portions of the modulator line 18, the detector line 26 and the ground line 28 to the adjacent lower surfaces of each of the modulator element 8 and the photodetector element 10 after positioning them on the substrate 4.

As another alternative, the laser element 6, the modulator element 8 and the photodetector element 10 may be attached to the substrate 4 with a conductive epoxy material, such as a silver-filled epoxy. In this case, the only radiation needed is the infrared light to facilitate alignment of the laser element 6, the modulator element 8 and the photodetector element 10 to the substrate 4, as explained in detail below.

According to the invention, the positioning of the laser element 6, the modulator element 8 and the photodetector element 10 to the substrate 4 is facilitated by the registration of special substrate alignment marks or features with special device alignment marks features that are themselves each fabricated in alignment with the optical axis of their respective surfaces.

Figure 4:
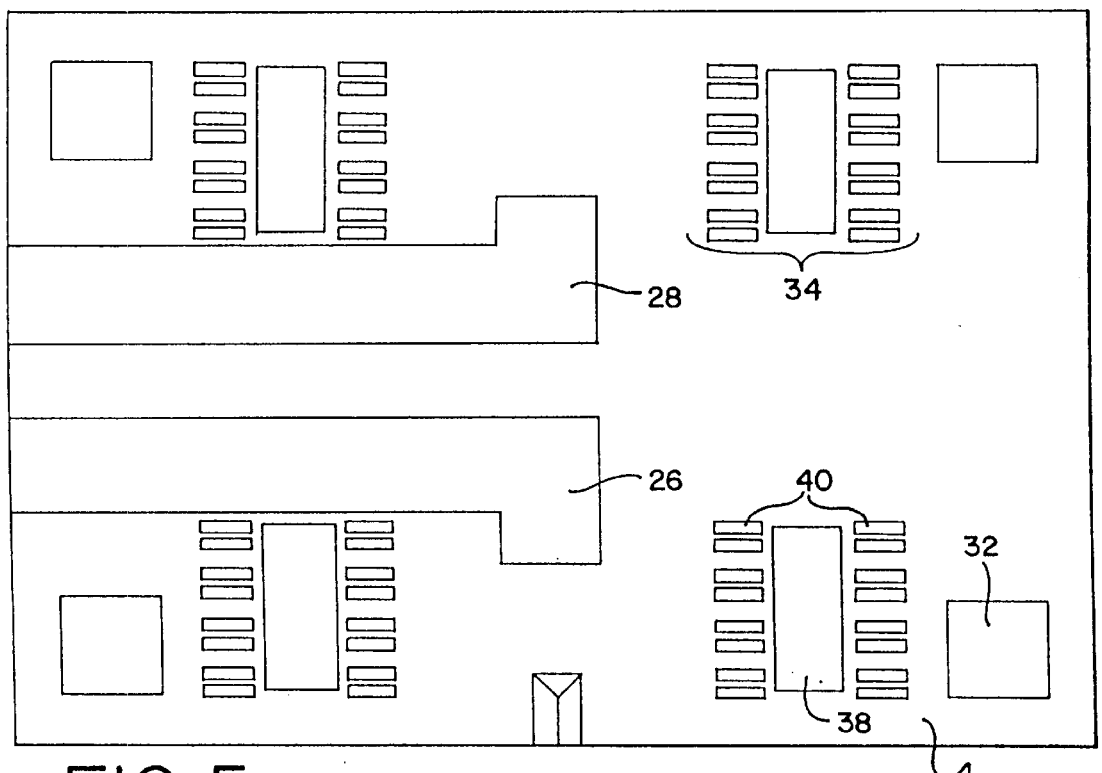
FIG. 4 is a detailed top view of the alignment features on the area of the substrate under a photodetector element.
Figure 5:
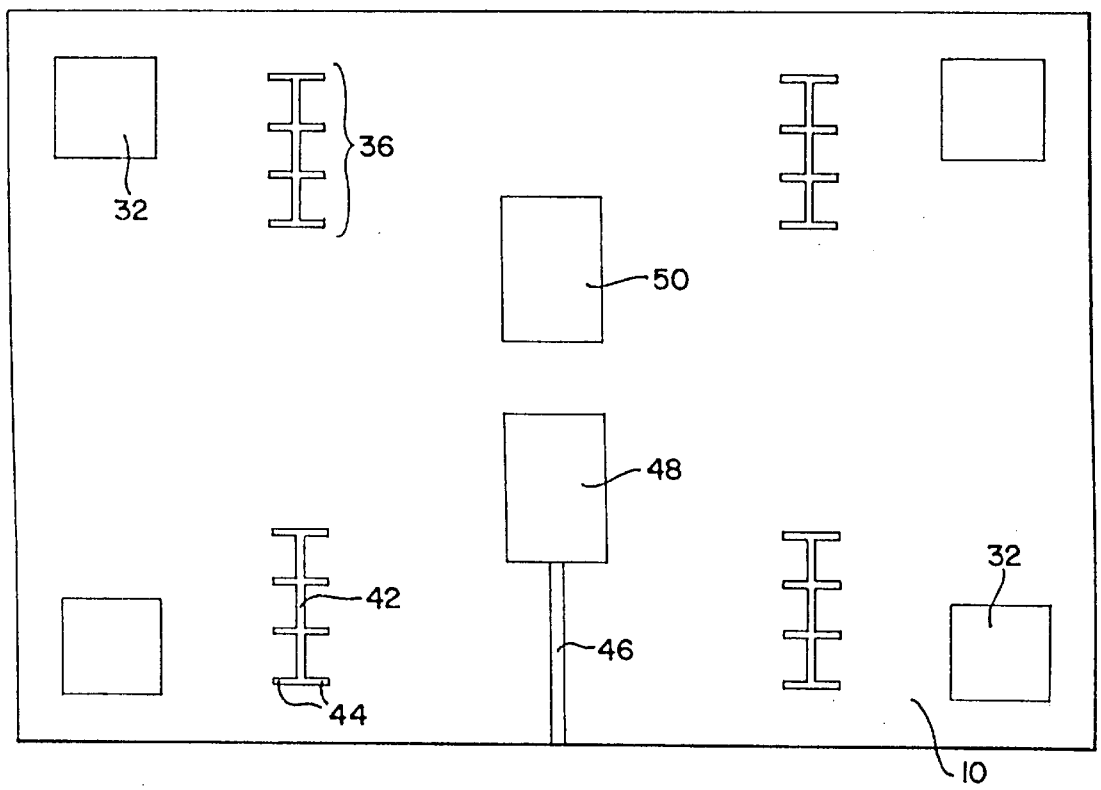
FIG. 5 is a bottom view of the substrate-mounted photodetector element that illustrates its alignment features according to the invention.

FIG. 4 is a detailed top view of the alignment features on the area of the substrate 4 under the photodetector element 10. FIG. 5 is a bottom view of the photodetector element 10 that illustrates its alignment features according to the invention. Alignment of the photodetector element 10 is implemented by registration of substrate alignment marks 34 on the upper surface of the substrate 4 with corresponding component alignment marks 36 on the lower surface of the photodetector element 10.

Each of the substrate alignment marks 34 comprise an infrared light absorptive or reflective pattern so that the alignment marks 34 can be distinguished with infrared light, such as infrared radiation produced by a laser or incoherent infrared light source (not shown), that penetrates through the substrate 4 or the photodetector element 10. The pattern of the substrate alignment marks 34 is shown as a generally rectangular window 38 flanked on each longer side by four sets of evenly spaced bar pairs 40. Although this pattern is preferred for the substrate alignment marks 34, other patterns may be used. The substrate alignment marks 34 are defined in the same processing step that defines the optical axis of the substrate 4. This means that the substrate alignment marks 34 are defined with the same mask layer that define the optical fiber channel 22.

Likewise, as shown in FIG. 5, the photodetector element 10 has corresponding complementary component alignment marks 36 that are formed on the underside of the photodetector element 10. Each of the component alignment marks 36 comprise an infrared light absorptive or reflective pattern so that the component alignment marks 36 can be distinguished with infrared radiation that penetrates through the substrate 4 or the photodetector element 10.

The pattern of the component alignment marks 36 is shown as a generally bar-shaped spine 42 that has four evenly spaced pairs of opposed and outwardly extending ribs 44. Although this pattern is preferred for the component alignment marks 36, other patterns may be used. The component alignment marks 36 are defined in the same processing step that defines the optical axis of the photodetector element 10. This means that the component alignment marks 36 are defined with the same mask layer that define a photodetector rib 46. The photodetector rib 46 defines the optical axis of the photodetector element 10.

Figure 6:
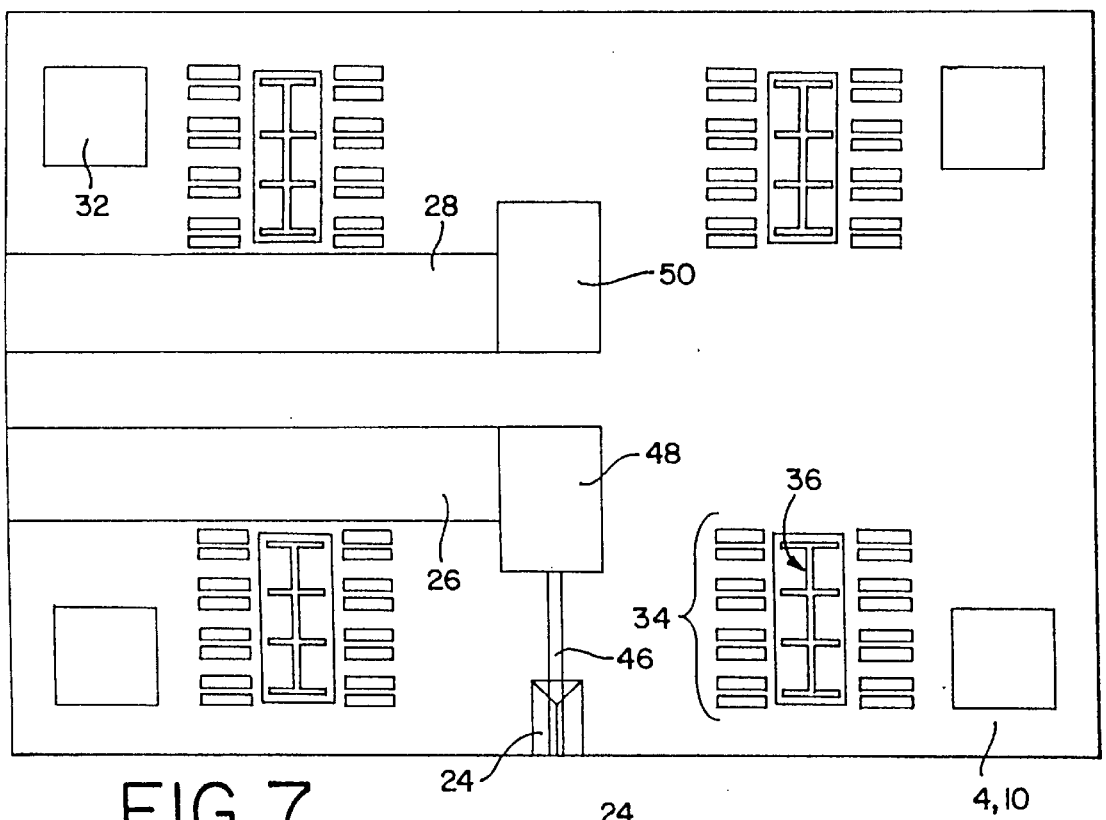
FIG. 6 is a detailed top view of the mounted photodetector element that renders the photodetector element transparent to illustrate the registration of the alignment features of the substrate with the alignment features on the photodetector element.

FIG. 6 is a detailed top view of the mounted photodetector element 10 that renders the photodetector element 10 transparent to illustrate the registration of the substrate alignment marks 34 with the component alignment marks 36. Alignment of the photodetector element 10 on the substrate 4 is confirmed by the registration of each of the substrate alignment marks 34 under the photodetector element 10 with each of the component alignment marks 36 on the lower surface of the photodetector element 10, using the infrared light for illumination.

With the patterns shown for the substrate alignment marks 34 and the component alignment marks 36 shown in FIGS. 4 and 5, this is implemented by aligning each rib 44 of each component alignment mark 36 with each respective bar pair 40 of each substrate alignment mark 34 while each component alignment mark 36 is completely visible within each respective rectangular window 38 of each substrate alignment mark 34.

As described above, the substrate alignment marks 34 and the component alignment marks 36 are registered with each other in an "in-line" relationship. Alternatively, alignment may comprise canting each of the component alignment marks 36 relative to the corresponding substrate alignment marks 34 by a predetermined fixed angle so that the adjacent surfaces between each of the the element 6, the modulator element 8, the photodetector element 10 and the optical fiber 20 have a skew that is defined by the same fixed angle.

This defined skew between surfaces lets multiple reflections of any radiation between any of the adjacent surfaces to "walk off" the interface between the surfaces rather than remain within the interface. This reduces interference due to internal reflection of the laser radiation produced by the laser element 6.

Also shown in FIG. 5 are four bonding pads 32, a detector output contact 48 and a detector ground contact 50. The detector output contact 48 and the detector ground contact 50 are typically small patches of metallization that make contact with adjacent portions of the detector output line 26 and the detector ground line 28 when the alignment procedure is completed. The bonding pads 32 and the contacts 48 and 50 on the photodetector element 10 are then preferably laser soldered to the respective bonding pads 32 and portions of the lines 26 and 28 on the substrate 4 to complete the mounting of the photodetector element 10.

Figure 7:
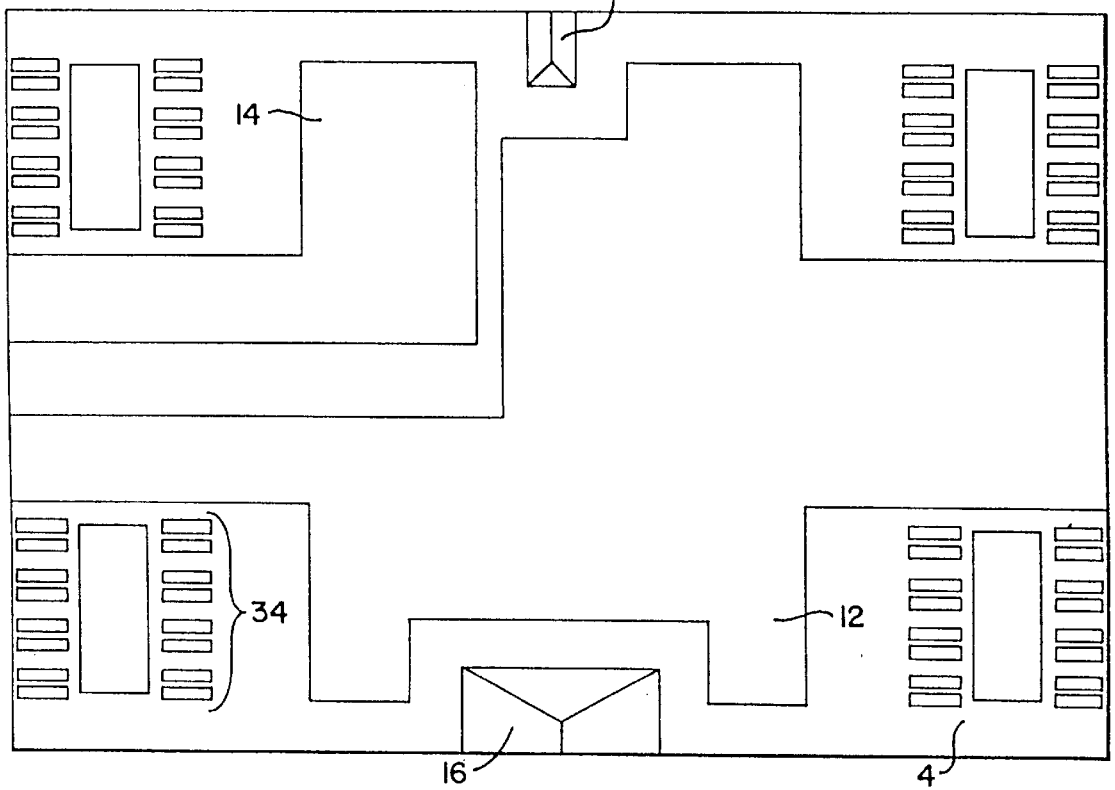
FIG. 7 is a detailed top view of the alignment features on the area of the substrate under a laser element.
Figure 8:
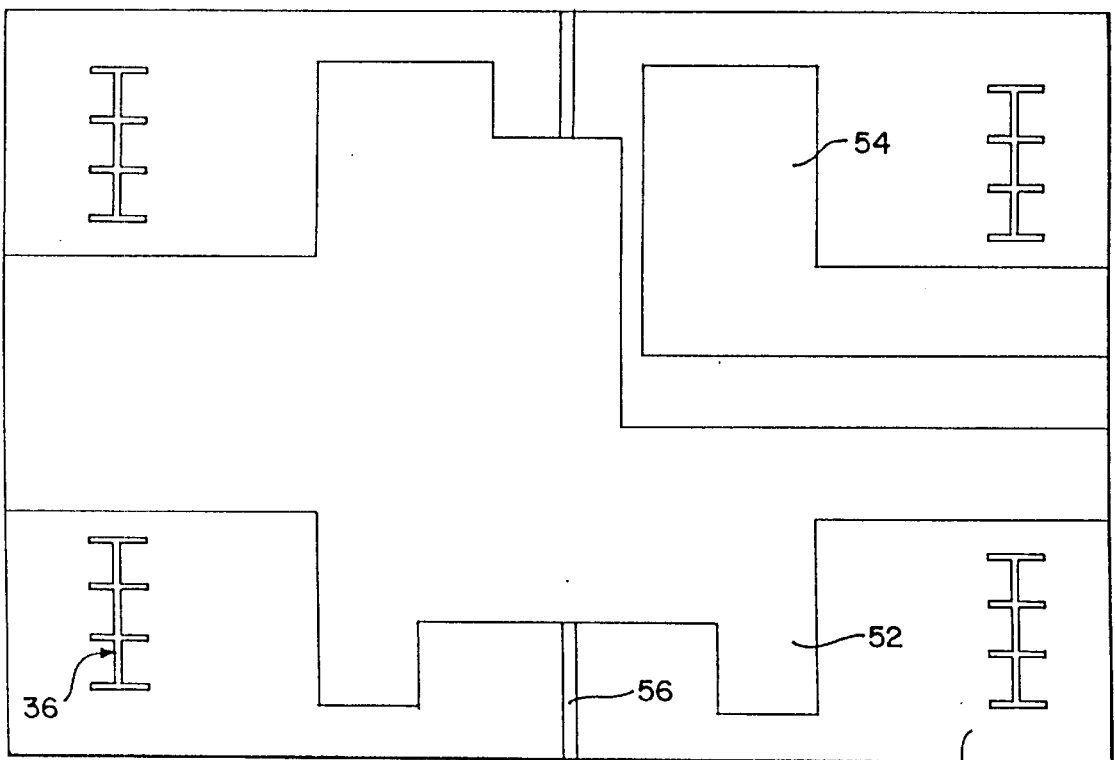
FIG. 8 is a bottom view of the substrate-mounted laser element that illustrates its alignment features according to the invention.
Figure 9:
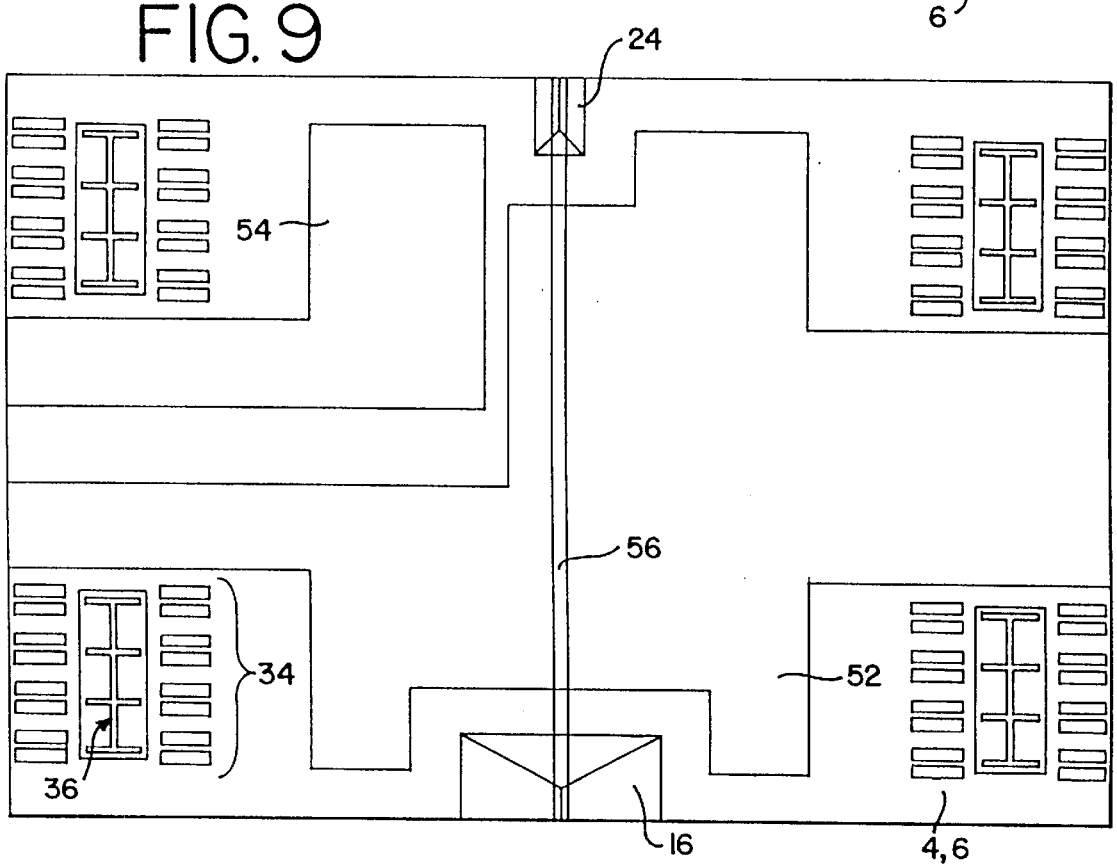
FIG. 9 is a detailed top view of the mounted laser element that renders the laser element transparent to illustrate the registration of the alignment features of the substrate with the alignment features on the laser element.

FIG. 7 is a detailed top view of the alignment features on the area of the substrate 4 under the laser element 6. FIG. 8 is a bottom view of the laser element 6 that illustrates its alignment features according to the invention. FIG. 9 is a detailed top view of the mounted laser element 6 that renders the laser element 6 transparent to illustrate the registration of the alignment features of the substrate 4 with the alignment features on the laser element 6.

The alignment marks 34 on the area of the substrate 4 under the laser element 6 are defined in the same processing step that defines the optical axis of the substrate 4, with the same mask layer that define the optical fiber channel 22. Similarly, the alignment marks 36 on the bottom of the laser element 6 are defined in the same processing step that defines a laser rib 56. The laser rib 56 defines the optical axis of the laser element 6.

Using the infrared light for illumination, alignment of the laser element 6 is implemented by registration of the substrate alignment marks 34 on the upper surface of the substrate 4 with the corresponding component alignment marks 36 on the lower surface of the laser element 6 in a similar manner as described above for the photodetector element 10.

Also shown in FIG. 8 are a laser power contact 52 and a laser ground contact 54. The laser power contact 52 and the laser ground contact 54 are typically large patches of metallization that make contact with adjacent portions of the power line 12 and the ground line 14 when the alignment procedure is completed. The contacts 48 and 50 on the photodetector element 10 are then preferably laser soldered to the portions of the lines 12 and 14 on the substrate 4 to complete the mounting of the laser element 6.

Figure 10:
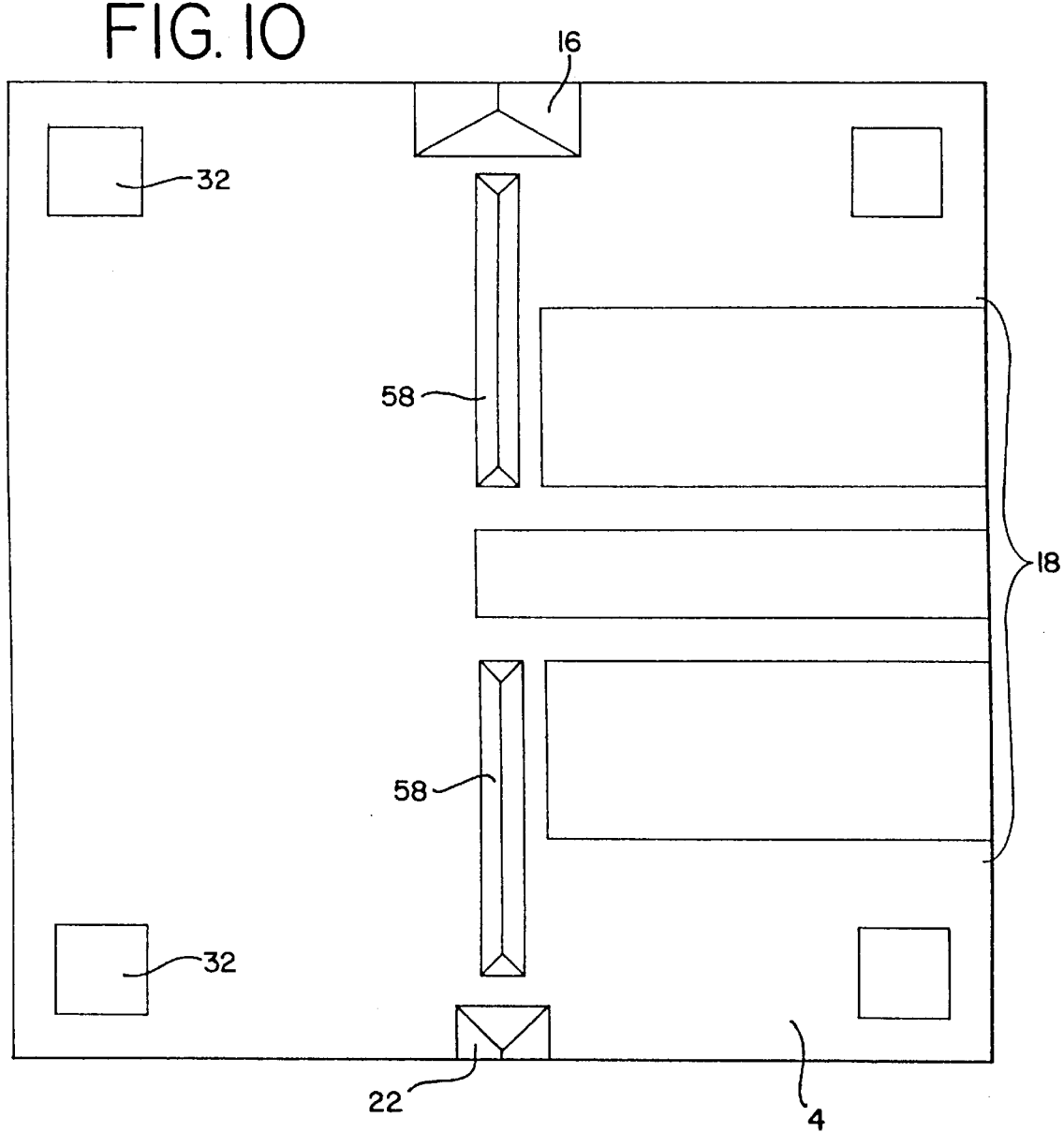
FIG. 10 is a detailed top view of the alignment features on the area of the substrate under a modulator element.
Figure 11:
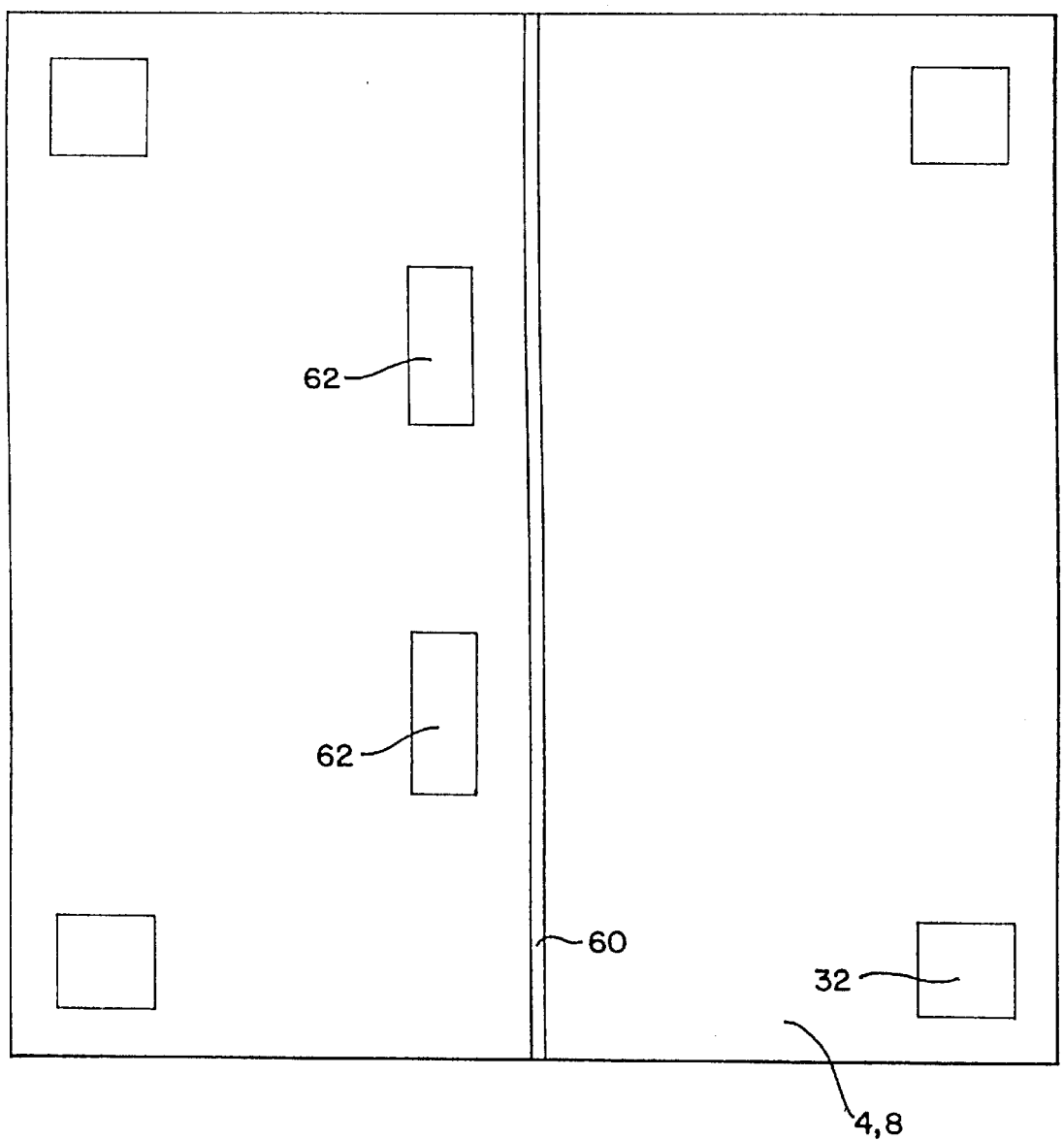
FIG. 11 is a bottom view of the substrate-mounted modulator element that illustrates its alignment features according to the invention.
Figure 12:
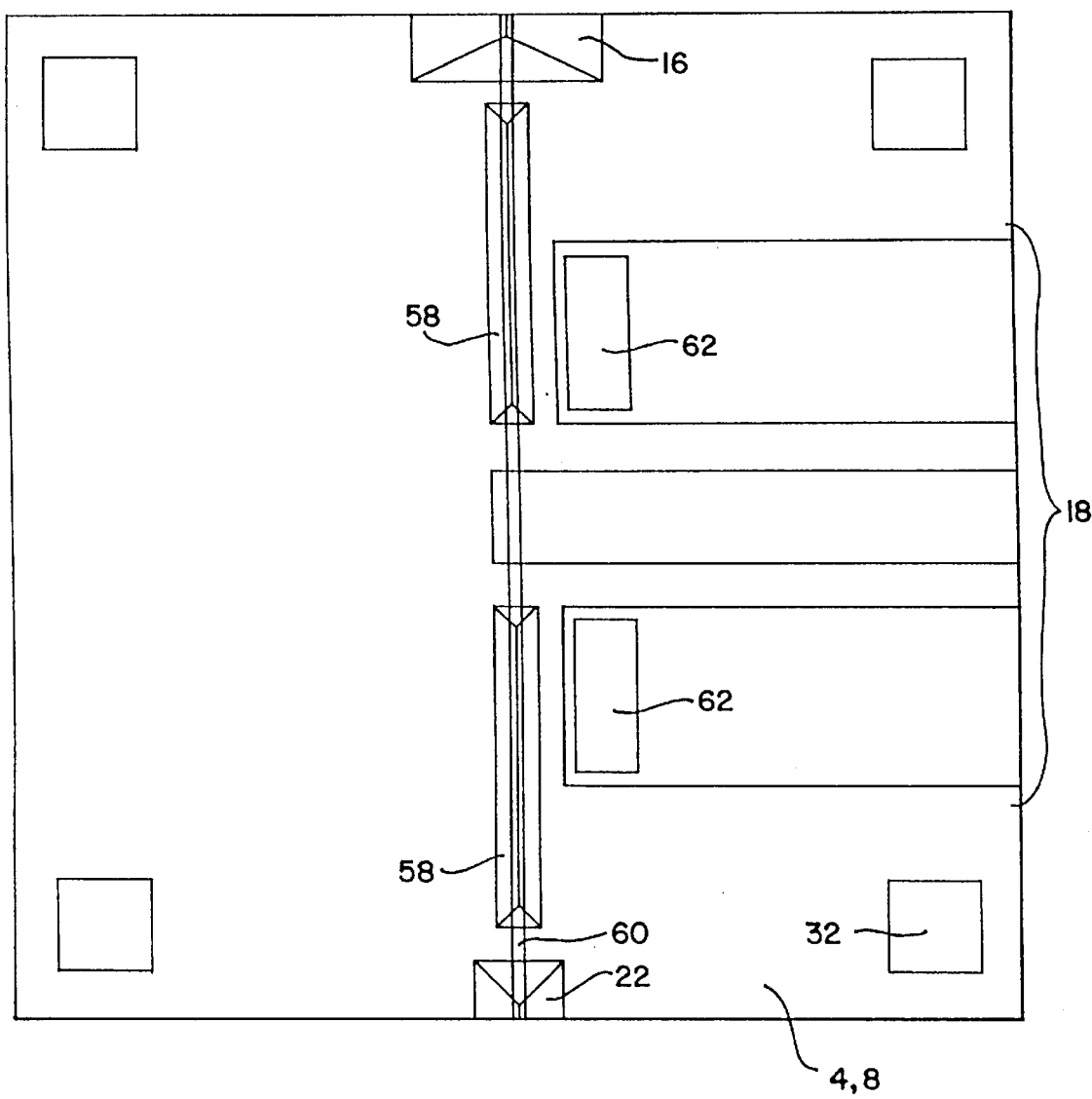
FIG. 12 is a detailed top view of the mounted modulator element that renders the modulator element transparent to illustrate the registration of the alignment features of the substrate with the alignment features on the modulator element.

FIG. 10 is a detailed top view of the alignment features on the area of the substrate 4 under the modulator element 8. FIG. 11 is a bottom view of the modulator element 8 that illustrates its alignment features according to the invention. FIG. 12 is a detailed top view of the mounted modulator element 8 that renders the modulator element 8 transparent to illustrate the registration of the alignment features of the substrate 4 with the alignment features on the modulator element 8.

As shown in FIG. 10, the substrate 4 has a pair of channels 58 that are anisotropically etched in its upper surface. The channels 58 are both aligned with the optical axis of the substrate 4 as defined by the axis of the channel 22 and they are formed in the same processing step as the channel 22.

The channels 58 are located on the substrate 4 to be in registration with a modulator rib 60 on the lower surface of the modulator element 8 when the modulator 8 is properly aligned on the substrate 4. The rib 60 defines the optical axis of the modulator element 8. Using the infrared light for illumination, alignment of the modulator element 8 is implemented by registration of the channels 58 on the upper surface of the substrate 4 with the rib 60 as described above for the laser element 6 and the photodetector element 10.

Modulator ground contacts 62 provide a circuit return for the modulator element 8 through the modulator line 18. The ground contacts 62 preferably each comprise a pattern of metallization on the bottom surface of the modulator element 8.

The modulator element 8 also has bonding pads 32 that, along with the modulator ground contacts 62, are then preferably laser soldered to the respective bonding pads 32 and the modulator line 18 on the substrate 4 to complete the mounting of the photodetector element 10.

Figure 13:
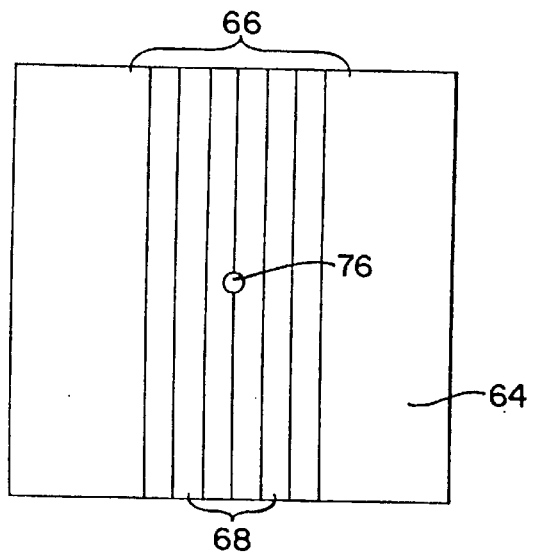
FIG. 13 is a bottom view of an optical fiber holder according to the invention.
Figure 14:
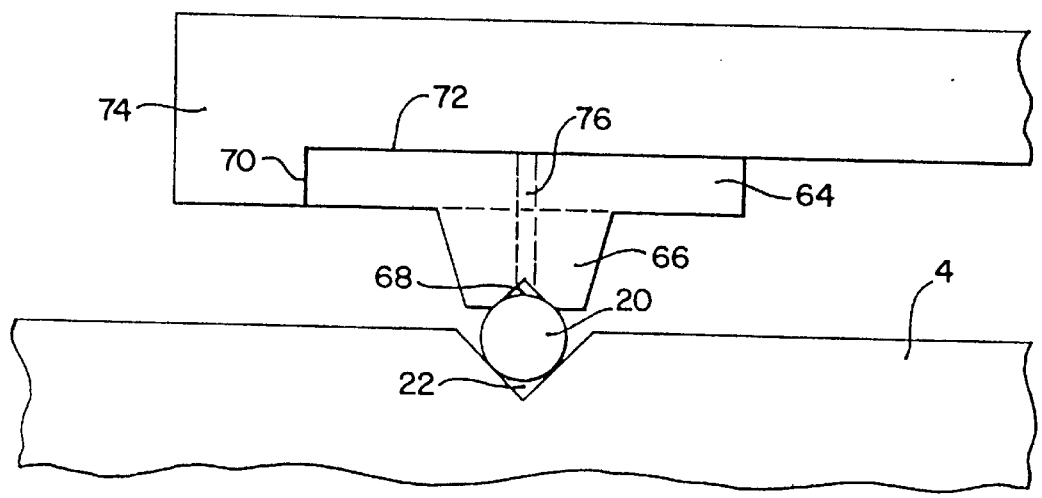
FIG. 14 is a first side view of the optical fiber holder shown in FIG. 13 during the alignment process.
Figure 15:
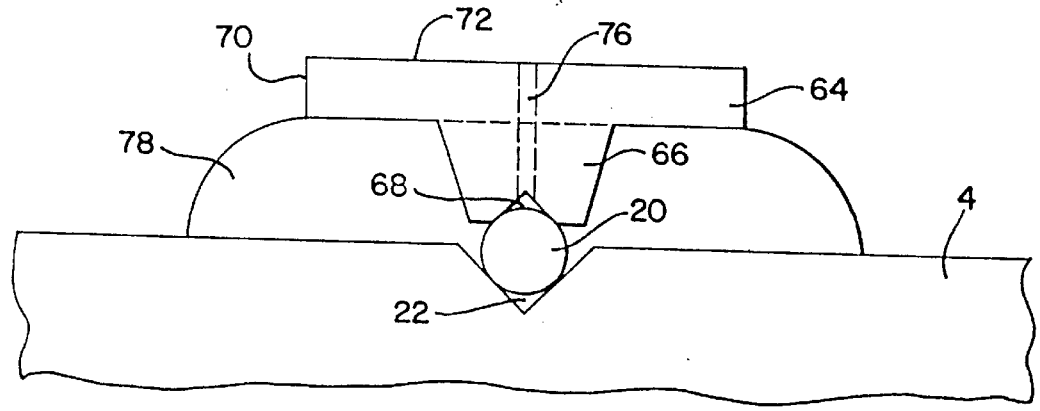
FIG. 15 is a second side view of the optical fiber holder shown in FIGS. 13 and 14 after mounting to a substrate with an optical fiber.

According to the invention, optical fibers, such as the optical fiber 20, are preferably aligned and attached with an optical fiber holder 64 as shown in FIGS. 13, 14 and 15. FIGS. 13, 14 and 15 are respective bottom, first and second end views of the fiber holder 64. The lower surface of the fiber holder 64 is generally planar, with a central pedestal region 66 that has a fiber holding groove 68 along its length.

An optical fiber, such as the optical fiber 20, is fastened in the groove 68 of the fiber holder 64. The fiber holder 64 has at least one side surface 70 and an upper surface 72 that are both substantially planar so that they may be used as reference surfaces for alignment purposes. For instance, in FIG. 14, the fiber holder 64 has its side surface 70 and its upper surface 72 butted against the adjacent surfaces of a vacuum chuck finger 74 for a manipulator (not shown) to assist in alignment of the optical fiber 20.

A small hole 76 that passes through the fiber holder 64 from the upper surface 72 to the groove 68 may be used to hold the optical fiber 20 in place during alignment. Alternatively, a small drop of epoxy may be used instead.

If the optical fiber 20 is polarization retentive and the optical fiber 20 is desired to be mounted in the channel 22 on the substrate 4 with a preferred polarization orientation, the optical fiber 20 may be rotated in the groove 68 so that its polarization has a fixed relationship to the upper surface 72, thereby providing a reference for polarization of the optical fiber 20 during alignment.

The upper surface 72 also serves as a large surface for secure attachment of the vacuum chuck 74. Even though the surface area of the upper surface 72 is large, the pedestal region 66 has a proportion of height to width to allow significant freedom of rotation of the optical fiber 20 during alignment without any portion of the lower surface of the fiber holder 64 coming into contact with the upper surface of the substrate 4.

After the optical fiber 20 is aligned in the channel 22 of the substrate 4 using the fiber holder 64 and the vacuum chuck 74, the fiber holder 64 and the optical fiber 20 are attached to the upper surface of the substrate with a bond 78, such as epoxy or solder, as shown in FIG. 15. The vacuum chuck 74 is then removed to complete the mounting of the optical fiber 20.

Figure 16:
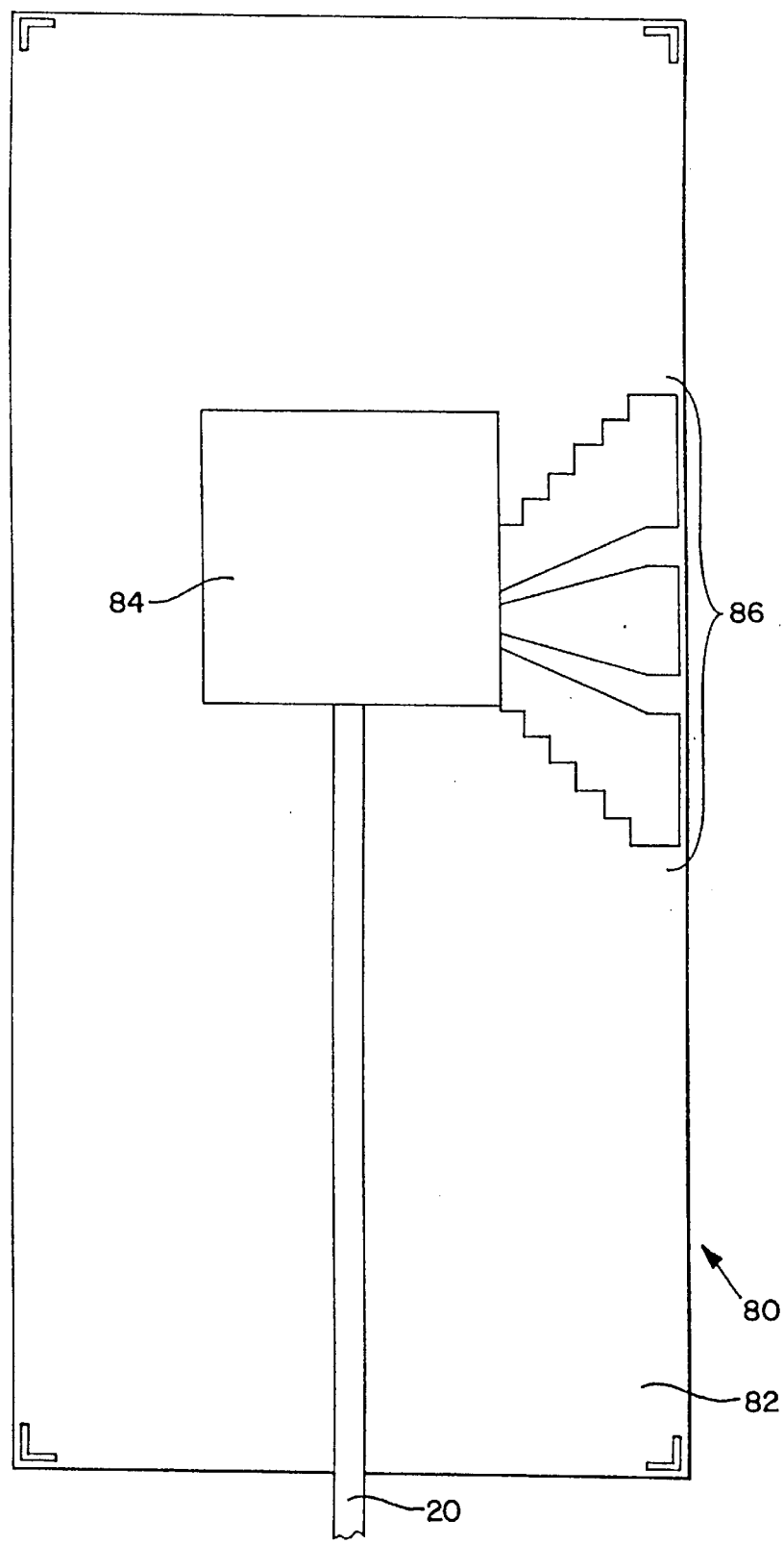
FIG. 16 is a top view of an optical receiver module according to the invention.

An electro-optical signal translator according to the invention may also comprise an optical receiver. FIG. 16 is a top view of an optical receiver module 80 that comprises a receiver module substrate 82, corresponding to the transmitter module substrate 4 described above, and a photodetector element 84, corresponding to the photodetector element 10 described above, that is coupled to an optical fiber 20.

Figure 17:
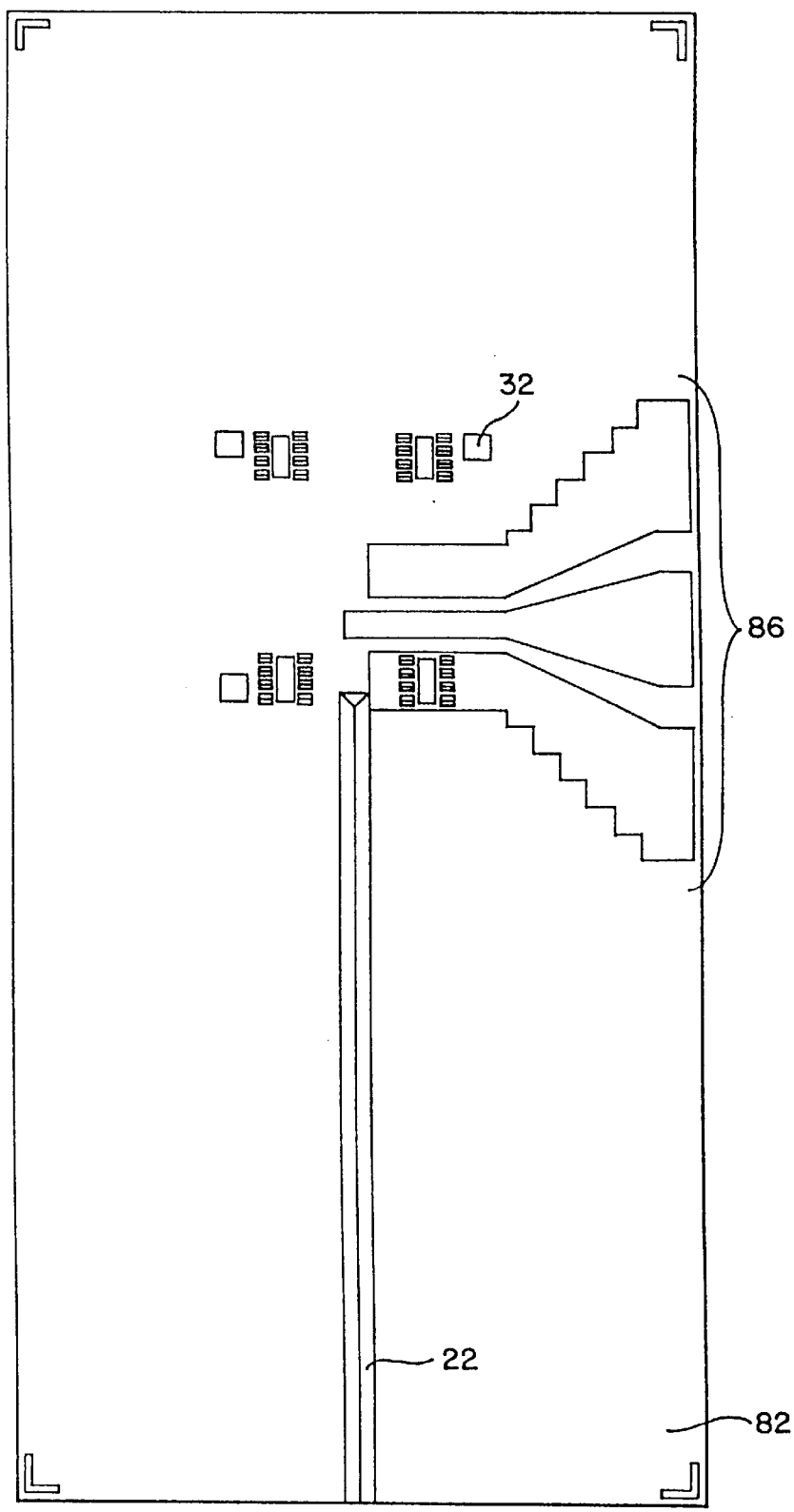
FIG. 17 is a top view of the substrate for the receiver module shown in FIG. 16 that illustrates its interfacial features for the components that it mounts.

FIG. 17 is a top view of the substrate 84 for the receiver module 80 shown in FIG. 16 that illustrates its interfacial features for the components that it mounts. The photodetector element 84 provides an electrical output signal that is proportional to the intensity of modulated light that is coupled to an optical input of the photodetector via the optical fiber 20.

The electrical output signal from the photodetector 84 is coupled to a detector output line 86. The detector output line 86 typically comprises a waveguide-type electrical transmission line metallization pattern that is fabricated on the surface of the substrate 4, like the modulator line 18 described above.

Figure 18:
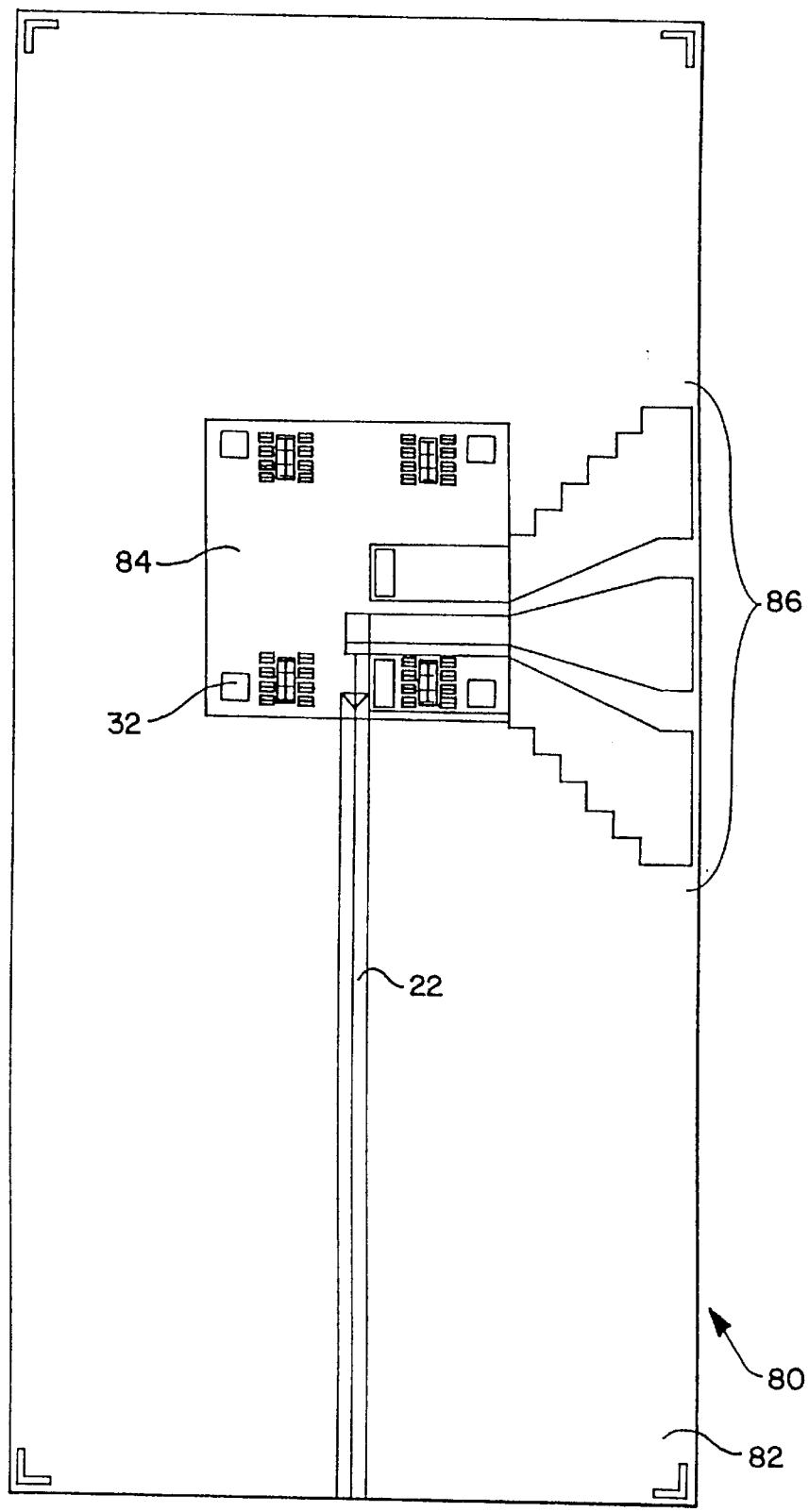
FIG. 18 is a top view of the receiver module shown in FIG. 16 that renders the receiver module components transparent to illustrate the registration of alignment features of the receiver module components with the alignment features on the substrate.

The receiver module 80 is preferably assembled using the same assembly methodology as described for the transmitter module 2 above. FIG. 18 is a top view of the receiver module 80 shown in FIG. 16 that renders the receiver module components transparent to illustrate the registration of alignment features of the receiver module components with the alignment features on the substrate 82.

Figure 19:
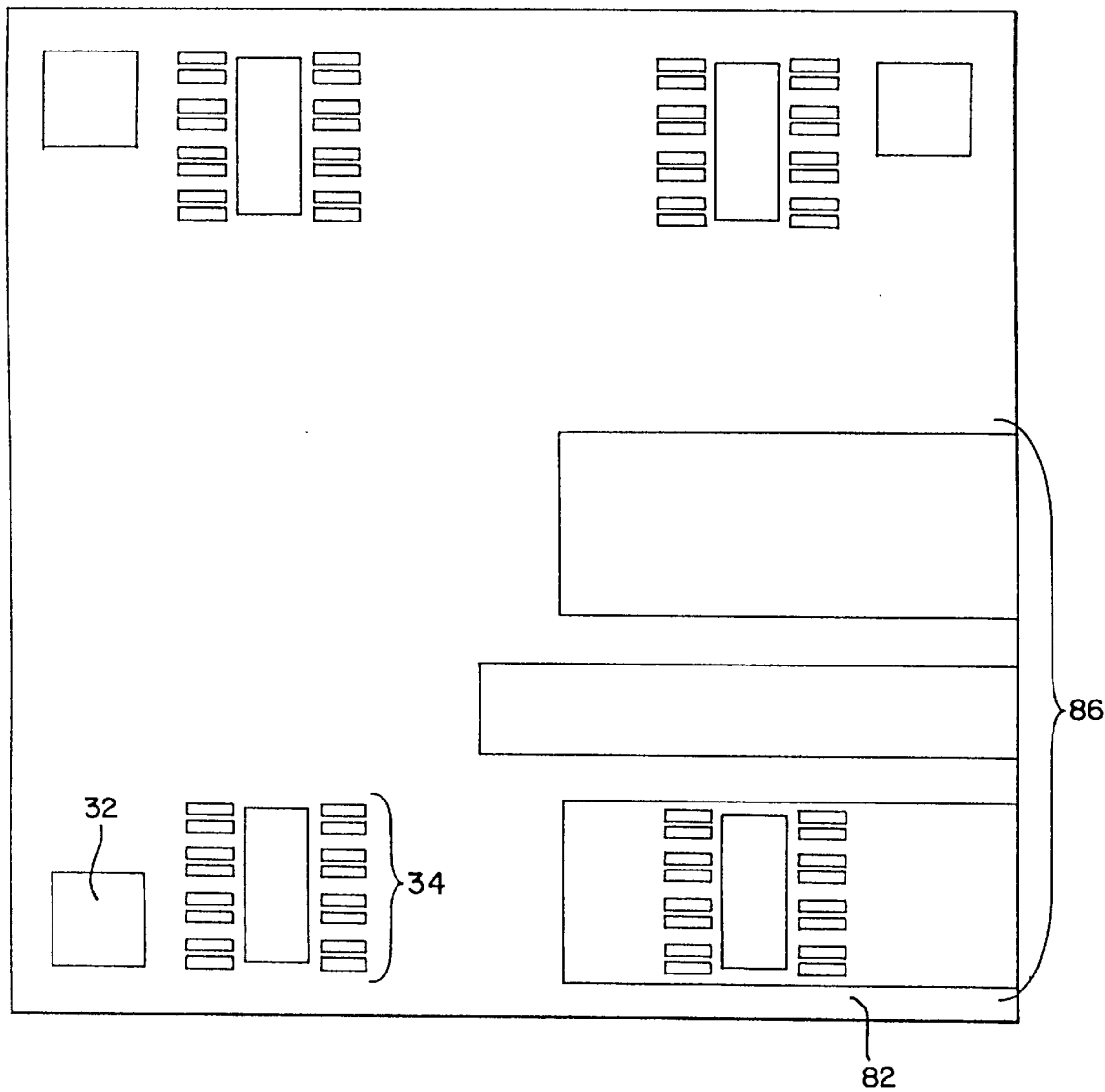
FIG. 19 is a detailed top view of the alignment features on the area of the substrate under a photodetector element.
Figure 20:
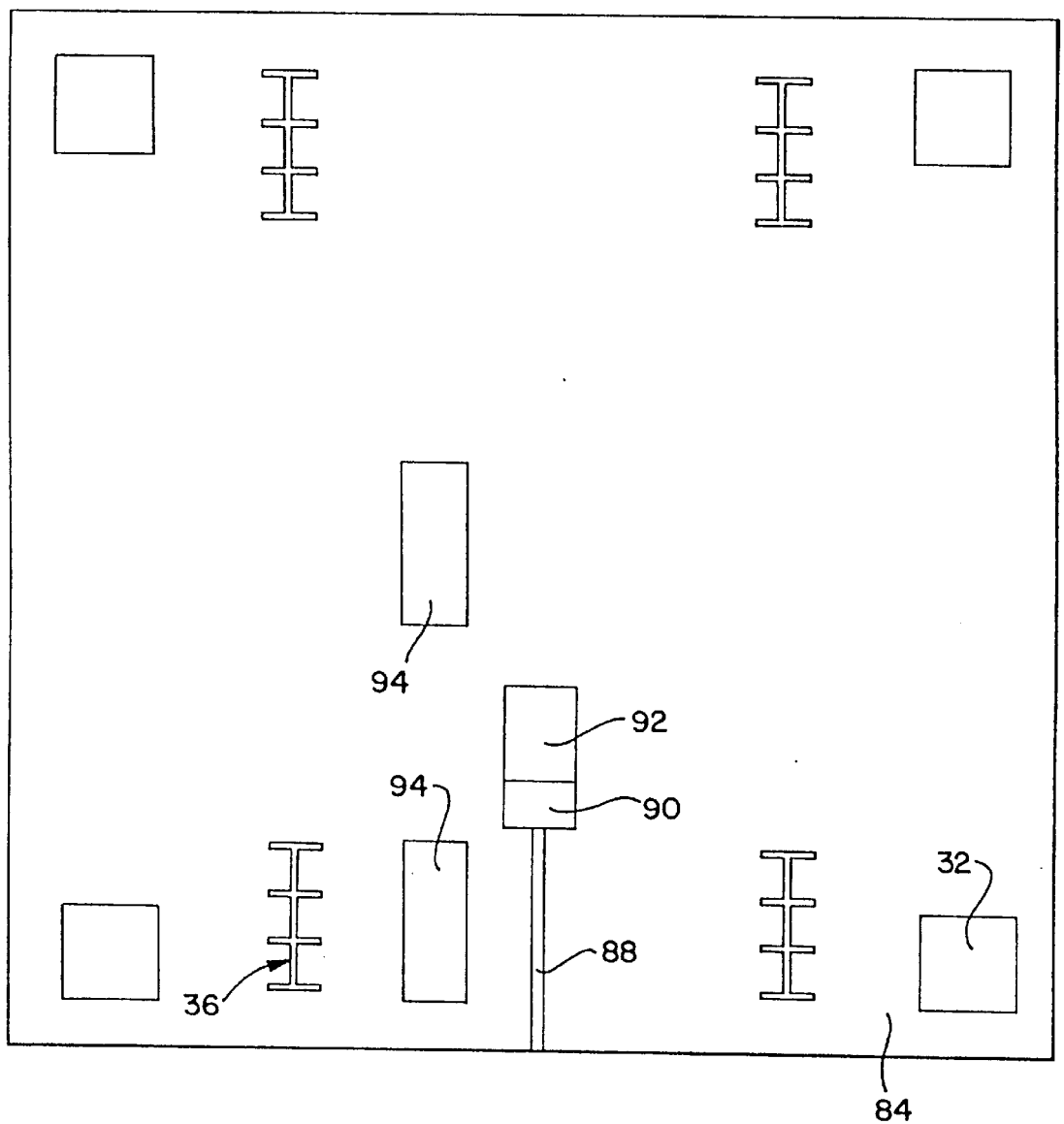
FIG. 20 is a bottom view of the substrate-mounted photodetector element that illustrates its alignment features according to the invention.
Figure 21:
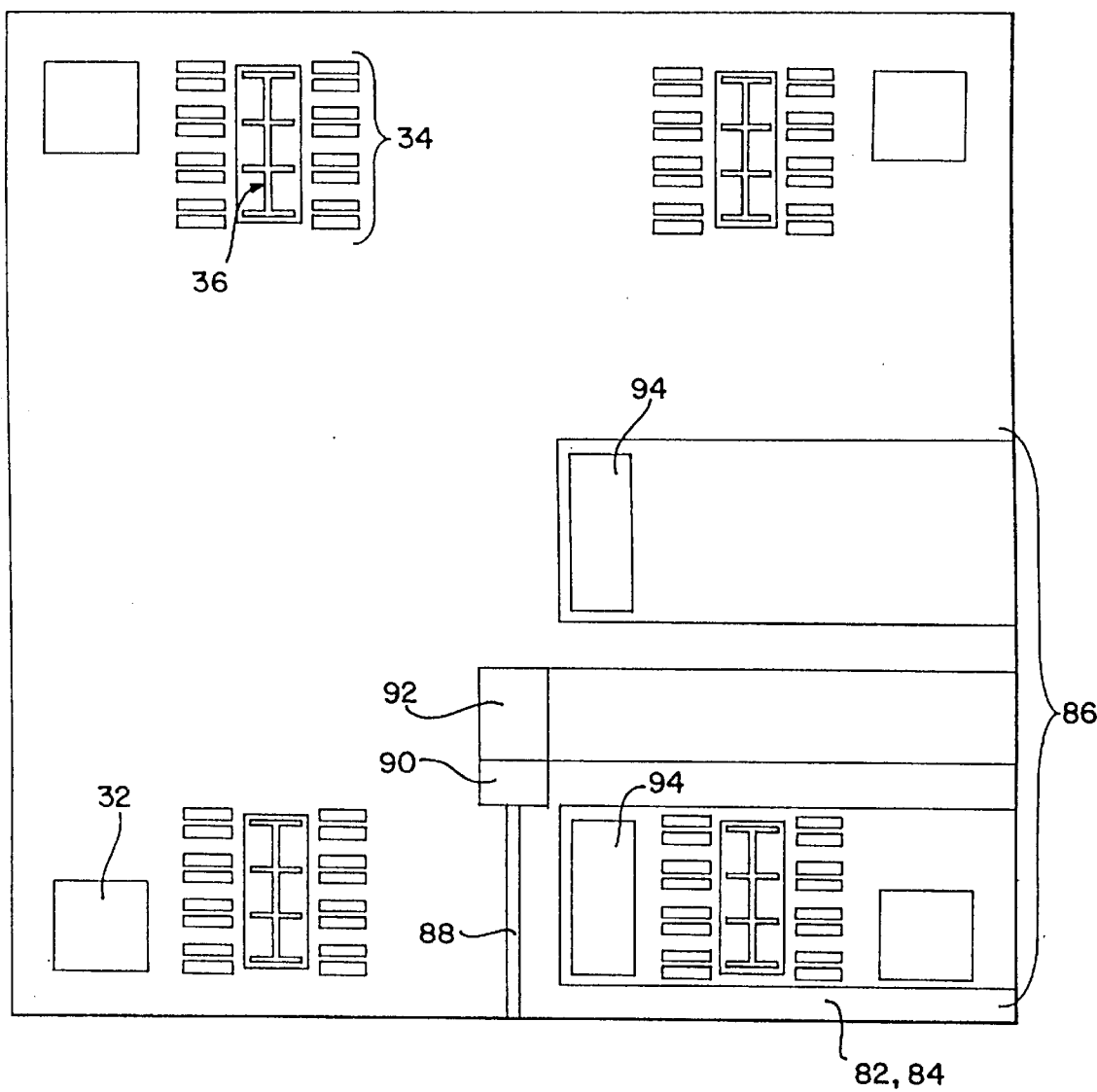
FIG. 21 is a detailed top view of the mounted photodetector element that renders the photodetector element transparent to illustrate the registration of the alignment features of the substrate with the alignment features on the photodetector element.

FIG. 19 is a detailed top view of the alignment features on the area of the substrate 82 under the photodetector element 84. FIG. 20 is a bottom view of the photodetector element 84 that illustrates its alignment features according to the invention. The upper surface of the substrate 82 includes substrate alignment marks 34 and the bottom surface of the photodetector element 84 includes component alignment marks 36. The photodetector element 84 and the substrate 82 are thus aligned by proper registration of the alignment marks 34 and 36 with each other using suitable illumination, such as infrared light, as described above for the transmitter module 2. FIG. 21 is a detailed top view of the mounted photodetector element 84 that renders the photodetector element transparent under suitable illumination to illustrate the registration of the alignment features of the substrate 82 with the alignment features on the photodetector element 84.

Just as described above for the transmitter module 2, the substrate alignment marks 34 and the component alignment marks 36 are fabricated to be in a fixed relationship with respect to the optical axes of the substrate 82 and the photodetector element 84. This means that the alignment marks 34 are formed on the substrate 82 in the same processing step that defines the channel 22, and the alignment marks 36 are formed in the same processing step that defines a detector rib 88.

The substrate 82 and the photodetector element 84 have complementary bonding pads 32 for secure attachment to each other after alignment, preferably by laser soldering, as described above for the transmitter module 2. An active region 90 of the photodetector 84, coupled to the detector rib 88, is positioned as close as possible to the interface between the optical fiber 20 and the detector rib 88 for best performance.

A detector output contact 92 provides electrical contact between the photodetector element 84 and the detector line 86. The detector contact 92 preferably comprises a pattern of metallization on the bottom surface of the photodetector element 84. The detector contact 92 is preferably laser soldered to the detector line 86, as described above for the transmitter module 2.

Detector ground contacts 94 provide a circuit return for the photodetector element through the detector line 86. The ground contacts 94 preferably each comprise a pattern of metallization on the bottom surface of the photodetector element 84. The detector ground contacts 94 are preferably laser soldered to the detector line 86, as described above for the transmitter module 2.

Thus there has been described herein optical unique signal translator design features, methods of fabrication, alignment techniques and alignment apparatus that utilize, with the exception of output optical fiber to transmitter module coupling, passive assembly techniques that are compatible with assembly line operations to produce high performance electro-optical signal translators.

What is claimed is:

1. An electro-optical translator that serves as an interface between electrical and optical signals, comprising:

a translator component mounting substrate having a defined optical axis
   at least one translator component having a defined optical axis that is mounted on an upper surface of said substrate;
   an optical fiber mounted on said upper surface of said substrate;
   first means for aligning said optical fiber substantially parallel with said optical axis of said substrate;
   at least one second means for aligning said at least one component on said upper surface of said substrate that has a fixed relationship with respect to said defined optical axis of said substrate; and
   at least one third means for aligning said at least one component on a lower surface of said at least one component that has a fixed relationship with respect to said defined optical axis of said at least one component and a fixed relationship with respect to said second at least one means for aligning.

2. The translator as set forth in claim 1, wherein said first means for aligning comprises a first groove for receiving said optical fiber that extends along said upper surface of said upper surface of said substrate.

3. The translator as set forth in claim 2, wherein said first groove is an anisotropically etched groove in said upper surface of said substrate, and said defined optical axis of said substrate is defined by said first groove.

4. The translator as set forth in claim 3, wherein said at least one second means for aligning comprises a substrate alignment mark that is in alignment with said first groove.

5. The translator as set forth in claim 1, wherein said defined optical axis is defined by an optical device rib that extends along said lower surface of said at least one component.

6. The translator as set forth in claim 5, wherein said third means for aligning comprises a component alignment mark that is in alignment with said optical device rib.

7. The translator as set forth in claim 1, wherein said at least one component comprises a photodetector element with an input having an optical axis substantially parallel to said upper surface of said substrate a predetermined distance above said upper surface, and said first groove has a first groove depth that maintains an optical axis of said optical fiber less that said predetermined distance of said optical axis of said photodetector element from said upper surface.

8. The translator as set forth in claim 3, wherein said at least one component comprises at least a modulator element having a modulator input and a laser element having a first laser output that are butt coupled together on said substrate, and further comprising a second groove extending along said upper surface of said substrate under said modulator input and said first laser output to prevent coupling of phase-mismatched light that is reflected off of the upper surface of said substrate.

9. The translator as set forth in claim 8, wherein said at least one component further comprises a photodetector element with a photodetector input butt coupled to said laser element and said laser element has a second laser output, and further comprising a third groove extending along said upper surface of said substrate under said photodetector input and said second laser output to prevent coupling of phase-mismatched light that is reflected off of the upper surface of said substrate.

10. The translator as set forth in claim 1, wherein said predetermined relationship between said first means for aligning and said second means for aligning comprises and in-line relationship.

11. The translator as set forth in claim 1, wherein said predetermined relationship between said first means for aligning and said second means for aligning comprises a skewed relationship.

12. For an electro-optical signal translator that serves as an interface between electrical and optical signals, a method of attaching an optic fiber to a translator component mounting substrate, comprising the steps of:
    attaching a planar surface of an optical fiber holder to a 20 manipulator;
    attaching said optical fiber to a groove that runs substantially parallel to said planar surface along an elevated pedestal region of said optical fiber holder;
    placing said optical fiber in a groove that runs along an upper surface of said mounting substrate with said manipulator; and
    attaching said optical fiber and optical fiber holder to said groove along said mounting substrate surface.

13. For an electro-optical signal translator that serves as an interface between electrical and optical signals, a method of aligning the optical polarization of an optic fiber to be attached to a translator component mounting substrate, comprising the steps of:
    rotating said optical fiber to have a predetermined angle of polarization relative to a substantially planar surface of an optical fiber holder;
    attaching said optical fiber in a groove of said optical fiber holder that runs substantially parallel to said planar surface of said optical fiber holder; and
    attaching said optical fiber to an upper surface of said mounting substrate with said planar surface of said optical fiber holder substantially parallel to said upper surface of said mounting substrate to align the polarization of said optical fiber to said predetermined angle of polarization relative to said upper surface of said mounting substrate.

14. For an electro-optical signal translator that serves as an interface between electrical and optical signals, a method of attaching an optic fiber to a translator component mounting substrate, comprising the steps of:
    mounting a photodetector element with an input having an optical axis substantially parallel to an upper surface of said substrate a predetermined distance above said upper surface;
    attaching said optic fiber in a groove running substantially parallel to said optical axis of said photodetector axis along said upper surface of said substrate with a groove depth that maintains an optical axis of said fiber less than said predetermined distance of said optical axis of said photodetector element from said upper surface.

15. For an electro-optical signal translator that serves as an interface between electrical and optical signals, an optical fiber holder for attaching an optic fiber to a translator component mounting substrate, comprising:
    a substantially planar upper surface;
    at least one substantially planar side surface that is substantially perpendicular to said upper surface;
    a pedestal region extending away from said upper surface that has a pedestal surface parallel to said upper surface; and
    a fiber-holding groove that runs along said pedestal surface substantially parallel to said side surface.

16. The optical fiber holder of claim 15 further comprising a lower surface adapted for attachment to an optical fiber in a substantially parallel relationship with said upper surface, said lower surface having a width less than the width of said upper surface.

17. The optical fiber holder of claim 16 wherein said lower surface comprises a longitudinal groove.

18. The translator of claim 1 further comprising an optical fiber holder, said holder comprising:
    a substantially planar manipulator engaging surface, said manipulator engaging surface being substantially parallel to the upper surface of said mounting substrate;
    a planar side surface substantially perpendicular to said manipulator engaging surface; and
    a fiber engaging surface adjacent said optical fiber, said fiber engaging surface having a width less than the width of said manipulator engaging surface.

19. The translator of claim 18 wherein said optical fiber holder further comprises a longitudinal groove in said fiber engaging surface, said groove being adjacent said optical fiber.

20. An electro-optical translator comprising:
    a translator component mounting substrate having a defined optical axis and a substrate alignment mark on the upper surface of said substrate, said alignment mark having a fixed relationship with said optical axis; and a translator component mounted on the upper surface of said substrate, said component having a defined optical axis and a component alignment mark on the lower surface of said component, said alignment mark having a fixed relationship with said optical axis, wherein said component alignment mark is registered with said substrate alignment mark to effect the alignment of said optical axes.

* * * * *